(12) United States Patent
Kondo et al.

(10) Patent No.: US 11,908,090 B2
(45) Date of Patent: Feb. 20, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventors: Akane Kondo, Tokyo (JP); Tomoya Narita, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 96 days.

(21) Appl. No.: 17/629,144

(22) PCT Filed: Jul. 15, 2020

(86) PCT No.: PCT/JP2020/027508
§ 371 (c)(1),
(2) Date: Jan. 21, 2022

(87) PCT Pub. No.: WO2021/020130
PCT Pub. Date: Feb. 4, 2021

(65) Prior Publication Data
US 2022/0270330 A1    Aug. 25, 2022

(30) Foreign Application Priority Data
Jul. 29, 2019  (JP) .................. 2019-138532

(51) Int. Cl.
*G06T 19/00*   (2011.01)
*G06F 3/01*    (2006.01)

(52) U.S. Cl.
CPC .......... *G06T 19/006* (2013.01); *G06F 3/01* (2013.01); *G06T 19/00* (2013.01)

(58) Field of Classification Search
None
See application file for complete search history.

(56) References Cited

U.S. PATENT DOCUMENTS

| 2017/0270711 A1* | 9/2017 | Schoenberg ........ A63F 13/213 |
| 2019/0012838 A1* | 1/2019 | Uchida .................... G06T 7/73 |
| 2019/0265945 A1* | 8/2019 | Newell .................. G06Q 30/02 |

FOREIGN PATENT DOCUMENTS

| JP | 2012-221250 A | 11/2012 |
| JP | 2017-058971 A | 3/2017 |

(Continued)

*Primary Examiner* — Tapas Mazumder
(74) *Attorney, Agent, or Firm* — Paratus Law Group, PLLC

(57) ABSTRACT

There is provided an information processing device, an information processing method, and a program capable of appropriately displaying an object in a virtual space. Included is a setting unit that sets an initial position at which an object is initially displayed on a display unit on the basis of presentation position information regarding a presentation position to be presented in a virtual three-dimensional space of the object superimposed and displayed on a real world, size information regarding a size of the object, and field of view area information regarding a field of view area of the display unit that displays the object, in which the setting unit sets the initial position on a deeper side in a depth direction than a position represented by the presentation position information in a coordinate system based on the real world. The present technology can be applied to, for example, an information processing device that provides augmented reality (AR).

18 Claims, 17 Drawing Sheets

(56) References Cited

FOREIGN PATENT DOCUMENTS

| | | |
|---|---|---|
| JP | 2018-147002 A | 9/2018 |
| JP | 2019-016044 A | 1/2019 |
| JP | 2019-125278 A | 7/2019 |
| WO | WO 2017/169001 A1 | 10/2017 |

* cited by examiner

FIG. 9
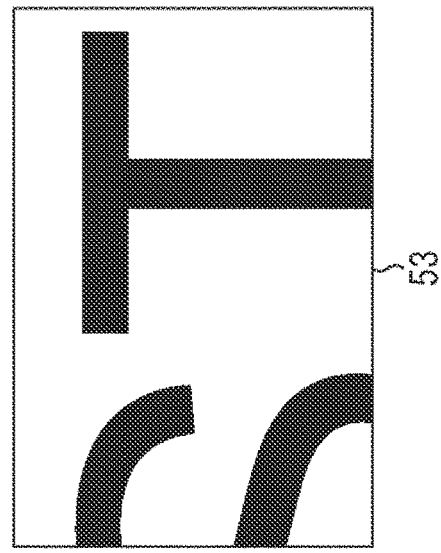
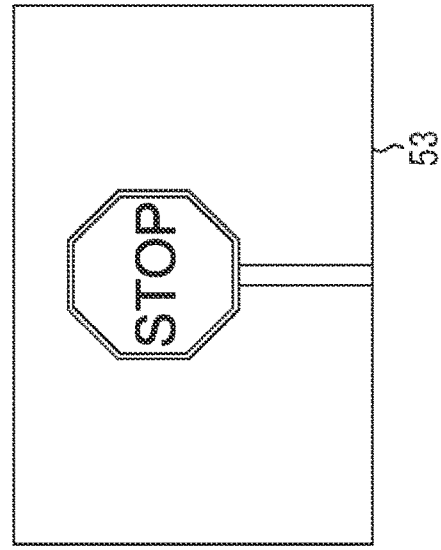

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/027508 (filed on Jul. 15, 2020) under 35 U.S.C. § 371, which claims priority to Japanese Patent Application No. 2019-138532 (filed on Jul. 29, 2019), which are all hereby incorporated by reference in their entirety.

TECHNICAL FIELD

The present technology relates to an information processing device, an information processing method, and a program, and relates to, for example, an information processing device, an information processing method, and a program for performing display preferable for a user when displaying a virtual object.

BACKGROUND ART

A technology is known called augmented reality (AR) in which additional information is superimposed on a real space and presented to a user. Information presented to the user in the AR technology is also referred to as an annotation. The annotation is visualized by virtual objects in various forms such as text, an icon, and an animation.

Patent Document 1 proposes that display of a virtual object is appropriately controlled not to confuse a user due to disturbance of display of the virtual object.

CITATION LIST

Patent Document

Patent Document 1: Japanese Patent Application Laid-Open No. 2012-221250

SUMMARY OF THE INVENTION

Problems to be Solved by the Invention

When an object is displayed, if a positional relationship between a user and the object is not appropriate, the object is not appropriately displayed. For example, when the object is displayed in front of the user's eyes (at a position close to the user), only a part of the object can be viewed, which is not an appropriate display, and there has been a possibility that discomfort or an uncomfortable feeling is given to the user.

The present technology has been made in view of such a situation, and an object thereof is to appropriately display an object or the like.

Solutions to Problems

An information processing device according to one aspect of the present technology includes a setting unit that sets an initial position at which an object is initially displayed on a display unit on the basis of presentation position information regarding a presentation position to be presented in a virtual three-dimensional space of the object superimposed and displayed on a real world, size information regarding a size of the object, and field of view area information regarding a field of view area of the display unit that displays the object, in which the setting unit sets the initial position on a deeper side in a depth direction than a position represented by the presentation position information in a coordinate system based on the real world.

An information processing method according to one aspect of the present technology includes: setting an initial position at which an object is initially displayed on a display unit on the basis of presentation position information regarding a presentation position to be presented in a virtual three-dimensional space of the object superimposed and displayed on a real world, size information regarding a size of the object, and field of view area information regarding a field of view area of the display unit that displays the object; and setting the initial position on a deeper side in a depth direction than a position represented by the presentation position information in a coordinate system based on the real world, by an information processing device.

A program according to one aspect of the present technology causes a computer to execute processing including steps of: setting an initial position at which an object is initially displayed on a display unit on the basis of presentation position information regarding a presentation position to be presented in a virtual three-dimensional space of the object superimposed and displayed on a real world, size information regarding a size of the object, and field of view area information regarding a field of view area of the display unit that displays the object; and setting the initial position on a deeper side in a depth direction than a position represented by the presentation position information in a coordinate system based on the real world.

In the information processing device, the information processing method, and the program according to one aspect of the present technology, the initial position at which the object is initially displayed on the display unit is set on the basis of the presentation position information regarding the presentation position in the virtual three-dimensional space of the object superimposed and displayed on the real world, the size information regarding the size of the object, and the field of view area information regarding the field of view area of the display unit that displays the object. The initial position is set on the deeper side in the depth direction than the position represented by the presentation position information in the coordinate system based on the real world.

Note that, the information processing device may be an independent device or an internal block included in one device.

Furthermore, the program can be provided by being transmitted via a transmission medium or by being recorded on a recording medium.

BRIEF DESCRIPTION OF DRAWINGS

FIG. 9 is a diagram illustrating an example of the screen to be displayed.

MODE FOR CARRYING OUT THE INVENTION

The following is a description of a mode for carrying out the present technology (the mode will be hereinafter referred to as the embodiment).

<Display Device for AR Content>

Figure 1:
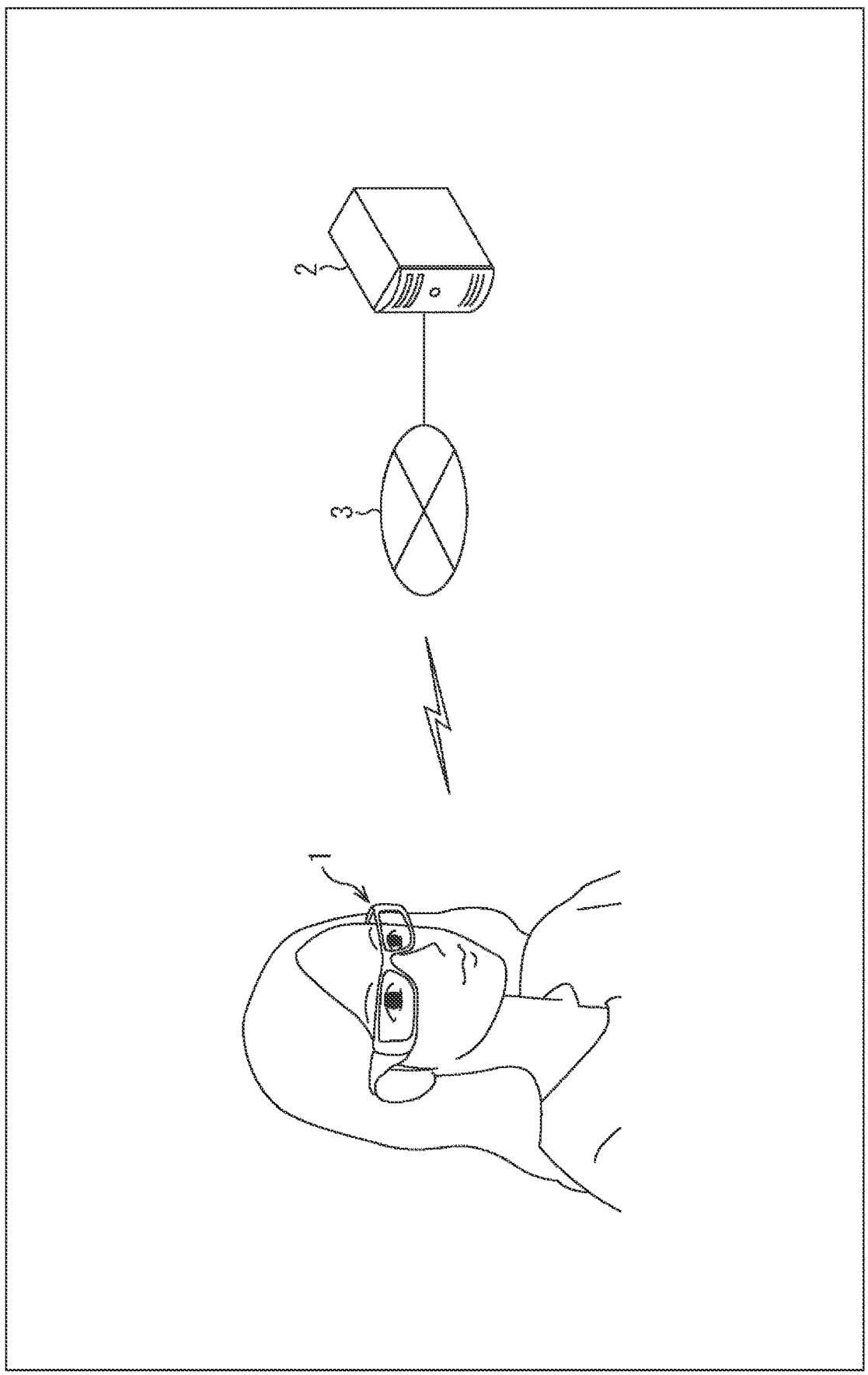
FIG. 1 is a diagram illustrating a configuration of an embodiment of an information processing system according to the present disclosure.

FIG. 1 is a diagram illustrating a configuration example of an information processing system according to an embodiment of the present technology.

The information processing system in FIG. 1 is configured by connecting an AR-HMD 1 and an information processing device 2 via a network 3 such as a local area network (LAN) or the Internet.

As illustrated in FIG. 1, the AR-HMD 1 is an eyeglass type wearable terminal including a transmissive display unit. The AR-HMD 1 displays a video image including various objects such as a character on the display unit in accordance with control of the information processing device 2 performed via the network 3. A user sees the objects superimposed on scenery in front of the user.

A projection method of the video image including the objects may be a virtual image projection method or a retinal projection method of directly forming an image on a retina of the user's eye.

The information processing device 2 reproduces an AR content and transmits video data obtained by the reproduction to the AR-HMD 1 to display the video image of the AR content on the AR-HMD 1. The information processing device 2 includes, for example, a personal computer (PC).

Figure 2:
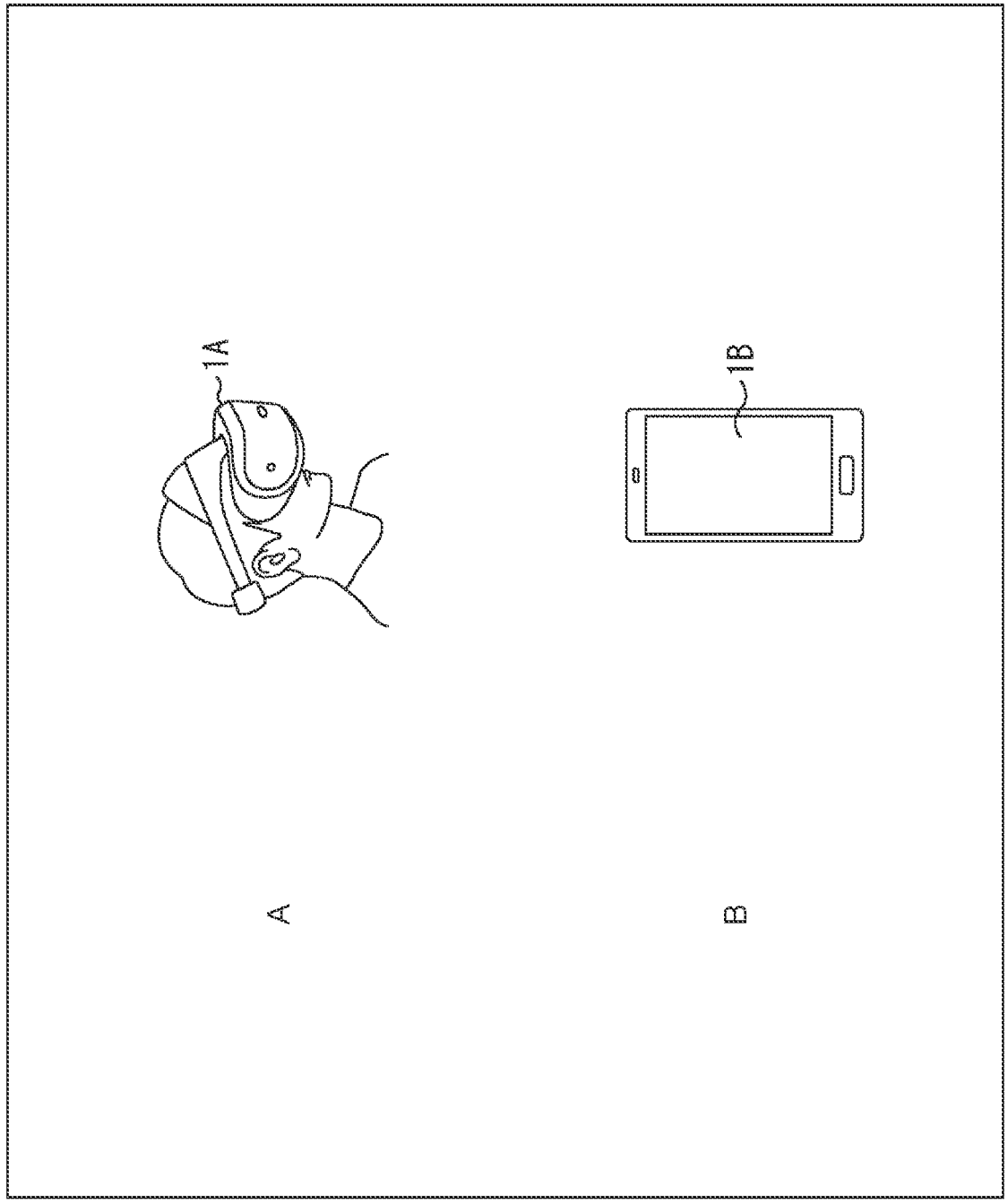
FIG. 2 is a diagram illustrating an example of a display device.

Instead of the AR-HMD 1, an AR-HMD 1A that is a video transmissive HMD illustrated in A of FIG. 2, or a mobile terminal such as a smartphone 1B illustrated in B of FIG. 2 may be used as a display device for the AR content.

In a case where the AR-HMD 1A is used as the display device, the video image of the AR content reproduced by the information processing device 2 is displayed to be superimposed on an image of scenery in front of the AR-HMD 1A captured by a camera provided in the AR-HMD 1A. A display that displays the AR content to be superimposed on the image captured by the camera is provided in front of the eyes of the user wearing the AR-HMD 1A.

Furthermore, in a case where the smartphone 1B is used, the video image of the AR content reproduced by the information processing device 2 is displayed to be superimposed on an image of scenery in front of the smartphone 1B captured by a camera provided on the back surface of the smartphone 1B. A display that displays various images is provided in the front surface of the smartphone 1B.

A projector that projects a video image on a surface of an object existing in an actual scene may be used as a display device for the AR content. Various devices such as a tablet terminal and a television receiver can be used as display devices for the AR content.

The display device and the information processing device 2 may be connected by wire instead of being wirelessly connected via the network 3.

<Appearance Configuration of AR-HMD>

Figure 3:
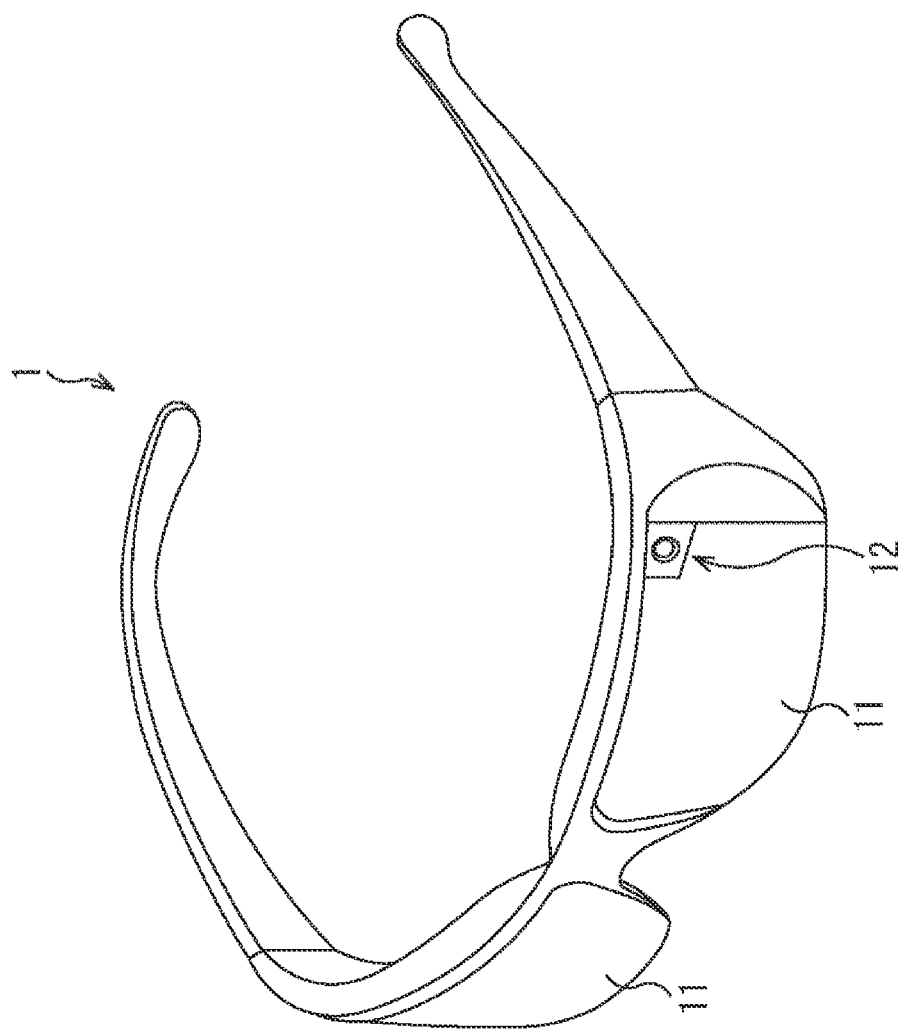
FIG. 3 is a diagram illustrating an appearance configuration of an AR-HMD to which the technology according to the present disclosure is applied.

In the following description, as illustrated in FIG. 3, a wearable terminal having an eyeglass-type shape will be described as an example of an information processing device to which the present technology is applied.

The AR-HMD 1 illustrated in FIG. 3 has an eyeglass-type shape as a whole, and includes a display unit 11 and a camera 12.

The display unit 11 corresponds to a lens portion of eyeglasses, and is configured as, for example, a transmissive display in its entirety. Thus, the display unit 11 transparently superimposes and displays an annotation (virtual object) on a real world image (real object) directly visually recognized by the user.

The camera 12 is provided at an end of the display unit 11 corresponding to the left eye of the user wearing the AR-HMD 1, and captures an image of a real space included in a field of view of the user. The camera 12 includes a solid-state imaging element, for example, a charge coupled device (CCD) image sensor, a complementary metal oxide semiconductor (CMOS) image sensor, or the like. Note that, regarding each sensor, a plurality of the sensors may be provided. That is, the camera 12 may be configured as a stereo camera.

The image acquired by the camera 12 can be displayed on the display unit 11, and an annotation can be superimposed and displayed on the image.

Furthermore, although not illustrated, various sensors, buttons, speakers, and the like are housed or mounted in a housing corresponding to a frame of eyeglasses in the AR-HMD 1.

Note that, the shape of the AR-HMD 1 is not limited to the shape illustrated in FIG. 3, and various shapes can be adopted, such as a hat shape, a belt shape fixed around the head of the user, and a helmet shape covering the entire head of the user. That is, the technology according to the present disclosure can be applied to all HMDs.

<Configuration example of AR-HMD as information processing device>

Figure 4:
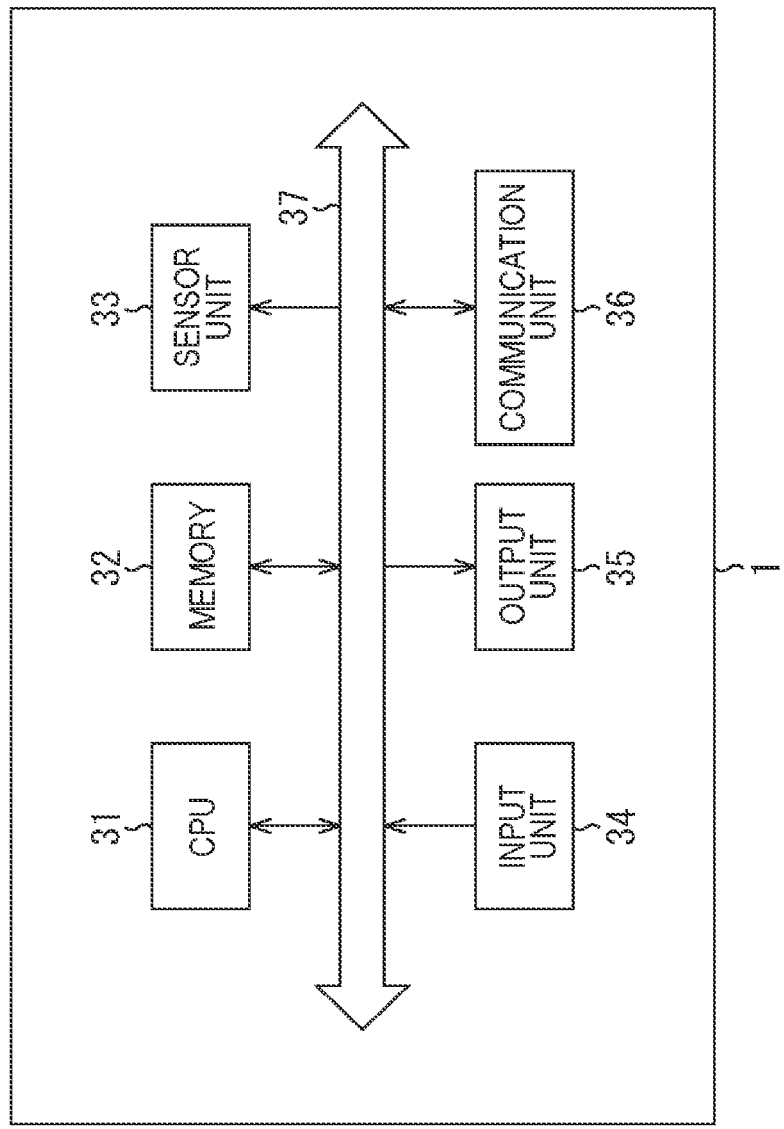
FIG. 4 is a block diagram illustrating a configuration example of the AR-HMD as an information processing device.

FIG. 4 is a block diagram illustrating a configuration example of the AR-HMD 1 as the information processing device.

The AR-HMD 1 in FIG. 4 includes a central processor unit (CPU) 31, a memory 32, a sensor unit 33, an input unit 34, an output unit 35, and a communication unit 36. These are connected to each other via a bus 37.

The CPU 31 executes processing for implementing various functions of the AR-HMD 1 in accordance with programs, data, and the like stored in the memory 32.

The memory 32 includes a storage medium such as a semiconductor memory or a hard disk, and stores programs and data for the processing by the CPU 31.

The sensor unit 33 includes various sensors such as the camera 12 in FIG. 3, a microphone, a gyro sensor, and an acceleration sensor. Various pieces of sensor information acquired by the sensor unit 33 are also used for the processing by the CPU 31.

The input unit 34 includes buttons, keys, a touch panel, and the like. The output unit 35 includes the display unit 11 in FIG. 3, a speaker, and the like. The communication unit 36 is configured as a communication interface that mediates various communications.

<Functional Configuration Example of AR-HMD>

Figure 5:
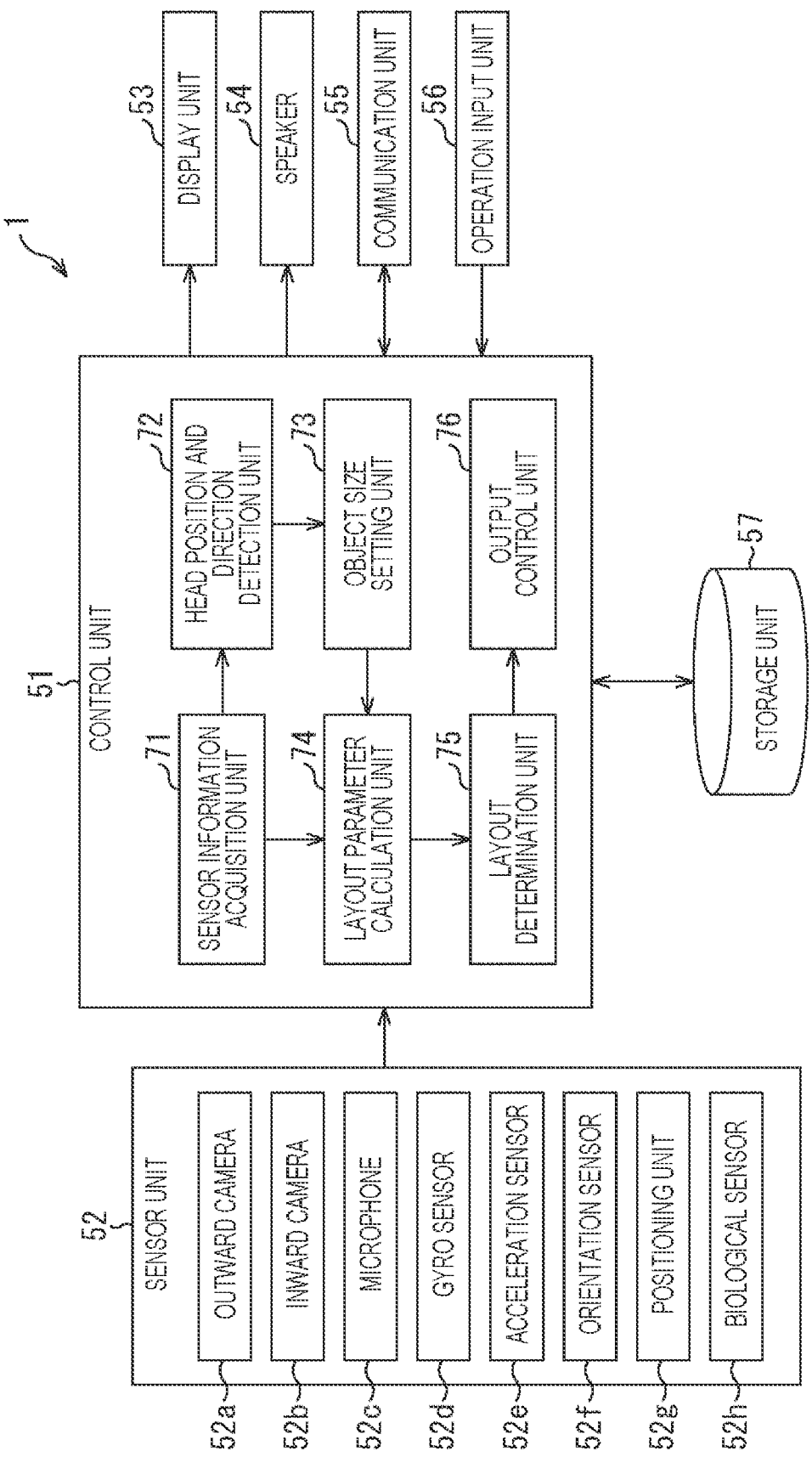
FIG. 5 is a block diagram illustrating a functional configuration example of the AR-HMD.

FIG. 5 is a block diagram illustrating a functional configuration example of the AR-HMD 1 to which the technology according to the present disclosure is applied.

The AR-HMD 1 in FIG. 3 includes a control unit 51, a sensor unit 52, a display unit 53, a speaker 54, a communication unit 55, an operation input unit 56, and a storage unit 57.

The control unit 51 corresponds to the CPU 31 in FIG. 4, and executes processing for implementing various functions of the AR-HMD 1.

The sensor unit 52 corresponds to the sensor unit 33 in FIG. 3 and includes various sensors.

Specifically, the sensor unit 52 includes an outward camera 52a corresponding to the camera 12 in FIG. 3, an inward camera 52b that captures an image of the user wearing the AR-HMD 1, and a microphone 52c that collects sound around the AR-HMD 1. In particular, it becomes possible to detect the user's line of sight with the inward camera 52b.

Furthermore, the sensor unit 52 includes a gyro sensor 52d that detects an angle (posture) and an angular velocity of the AR-HMD 1, an acceleration sensor 52e that detects acceleration, and an orientation sensor 52f that detects a direction. These may be configured individually or integrally.

Moreover, the sensor unit 52 includes a positioning unit 52g for positioning a position by a satellite positioning system such as a global positioning system (GPS) system, and a biological sensor 52h that acquires biological information (heart rate, body temperature, brain waves, and the like) of the user wearing the AR-HMD 1.

Various pieces of sensor information acquired by these sensors are used for processing executed by the control unit 51.

The display unit 53 corresponds to the display unit 11 in FIG. 3, and displays an annotation or displays an image acquired by the outward camera 52a in accordance with control of the control unit 51.

The speaker 54 serves as a sound source of sound to be output toward the user, and outputs the sound in accordance with control of the control unit 51.

The communication unit 55 corresponds to the communication unit 36 in FIG. 4, and performs various communications with other devices, for example, the information processing device 2 (FIG. 1).

The operation input unit 56 corresponds to the input unit 34 in FIG. 4, and receives the user's operation input to the AR-HMD 1.

The control unit 51 controls an output associated with a position of a real object or a virtual object on the basis of a positional relationship between a display area of the display unit 53 of the AR-HMD 1 and the real object or the virtual object arranged in a three-dimensional space, and user action information (hereinafter, also simply referred to as action information) representing an action of the user. The three-dimensional space herein may be a real space or a virtual space.

Specifically, the control unit 51 executes a predetermined program to implement a sensor information acquisition unit 71, a head position and direction detection unit 72, an object size setting unit 73, a layout parameter calculation unit 74, a layout determination unit 75, and an output control unit 76.

The sensor information acquisition unit 71 acquires sensor information from the sensor unit 52, and acquires user action information representing the action of the user wearing the AR-HMD 1 on the basis of the sensor information. The user action information includes dynamic information regarding action of the entire body of the user or each part thereof, movement of the user's line of sight (change in line-of-sight position), change in distance between the user and an object, and the like. Furthermore, the sensor information acquisition unit 71 acquires user position and posture information (hereinafter, it is also simply referred to as position and posture information) representing a position and posture of the user wearing the AR-HMD 1 on the basis of the sensor information acquired from the sensor unit 52. The user position and posture information includes static information regarding the posture and position of the user, the distance between the user and the object, and the like.

The head position and direction detection unit 72 detects a position of the head of the user and a direction in which the head of the user faces (a direction in which the user looks) from the information acquired by the sensor information acquisition unit 71.

The object size setting unit 73 sets a size, a display position, and the like of an object to be displayed. As will be described later, in a case where there is the object to be displayed, the size and the display position of the object are set in consideration of a positional relationship with the user to show the object to the user without giving the user an uncomfortable feeling or discomfort.

The layout parameter calculation unit 74 calculates a parameter representing an action, position, state, and the like of the user on the basis of the sensor information acquired by the sensor information acquisition unit 71, specifically, the user action information and the user position and posture information acquired from the sensor information, and on the basis of the size and display position of the object set by the object size setting unit 73.

The layout determination unit 75 determines an output form of the output regarding the object to be displayed in the display area of the display unit 53 on the basis of the parameter calculated by the layout parameter calculation unit 74.

The output control unit 76 controls the output regarding the object in the display area of the display unit 53 with the output form determined by the layout determination unit 75.

The storage unit 57 stores various data necessary for the control unit 51 to perform control. A part of the storage unit 57 and the control unit 51 can be included in the information processing device 2 (FIG. 1).

<Case where Object Causes Insufficient Angle of view>

The AR-HMD 1 to which the present technology is applied sets the size and display position of the object to be displayed depending on the situation. Here, the object is, for example, a content such as text, an icon, or an animation.

A relationship between the object and a size of a virtual screen will be described with reference to FIG. 6. In the AR-HDM1, a maximum size of a displayable object varies depending on a distance between a wearer of the AR-HDM1 (a user 101 in FIG. 6) and an object (an object 121 in FIG. 6). The size of the displayable object depends on the size of the virtual screen.

The virtual screen is a screen virtually displayed on the display unit 53. The size of the virtual screen can be calculated on the basis of an expression (1) below.

[Expression 1]

$$W_{Disp} = 2d \cdot \tan\left(\frac{Fov(h)}{2}\right) \quad (1)$$

In the expression (1), d represents a distance between the user 101 and the virtual screen. FOV(h) represents a horizontal angle or a vertical angle of a FOV. The FOV stands for Field Of View and represents a field of view. In general, the FOV of the AR-HDM1 has a horizontal angle of 40 degrees and a vertical angle of 20 degrees. In the following description, the description will be continued by exemplifying a case where the values are set as values of the FOV.

When a maximum content size (virtual screen size) that can be displayed at a position of 100 cm (1 m) is calculated using the expression (1), the maximum content size is 73 cm in width and 35 cm in height. Furthermore, when the maximum content size (virtual screen size) that can be displayed at a position of 300 cm (3 m) is calculated, the maximum content size is 160 cm in width and 105 m in height. Furthermore, when the maximum content size (virtual screen size) that can be displayed at a position of 500 cm (5 m) is calculated, the maximum content size is 267 cm in width and 176 m in height.

Figure 6:
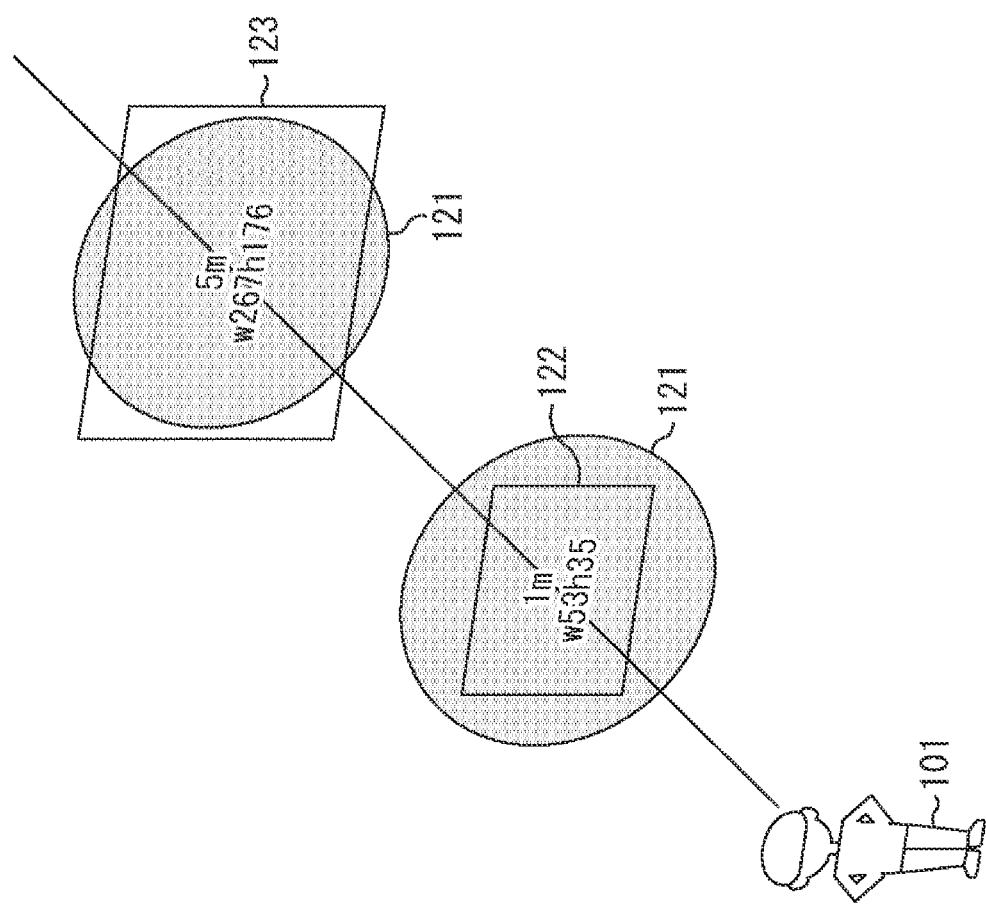
FIG. 6 is a diagram for explaining a virtual screen size.

Referring to FIG. 6, a virtual screen displayed at the position of 100 cm (1 m) is defined as a virtual screen 122, and a virtual screen displayed at the position of 500 cm (5 m) is defined as a virtual screen 123. In FIG. 6, the object 121 is represented by a circle.

When the object 121 is displayed on the virtual screen 122 located at 1 m, an insufficient angle of view occurs. In the state illustrated in FIG. 6, only a central portion of the object 121 is displayed. Note that, in the following description, the insufficient angle of view means that the object is displayed in a state of not falling within the display unit 53. Furthermore, the insufficient angle of view means that the object is displayed in a state of not falling within a field of view area of the user.

When the object 121 is displayed on the virtual screen 123 located at 5 m, the insufficient angle of view occurs (the object does not fall within the field of view area) in the vertical direction, but the object falls within the angle of view in the horizontal direction (within the field of view area). Thus, in the state illustrated in FIG. 6, the vertical direction of the object 121 is partially invisible, but the entire horizontal direction is visible.

For example, in the case of the display state on the virtual screen 122 illustrated in FIG. 6, the user cannot understand what is displayed, and may be in an undesirable state such as panicking or feeling uncomfortable. Furthermore, there is a possibility that the user cannot understand the situation, does not know what to do, and stops moving.

There is a portion where the insufficient angle of view occurs also in the case of the display state on the virtual screen 123 illustrated in FIG. 6, but the entire object is visible in the horizontal direction (the left-right direction in the figure), and thus, the user can recognize the size of the object 121. Thus, for example, the user can make a determination that the entire object 121 can be viewed if the user steps back, and can perform an action based on the determination.

For this reason, it is preferable that a display state does not occur like the virtual screen 122 in which the insufficient angle of view occurs at the distance d=1 m illustrated in FIG. 6. Regarding this, a description will be added with reference to FIG. 7. Note that, unless otherwise specified in the following description, coordinates, positions, and the like are coordinates, positions, and the like in the world coordinate system.

Note that, a position at which the object is displayed may be defined by a position based on the real world, or may be defined by a position based on a virtual three-dimensional space. Here, the description will be continued by exemplifying a case where the position is defined in the world coordinate system set in the virtual three-dimensional space.

Figure 7:
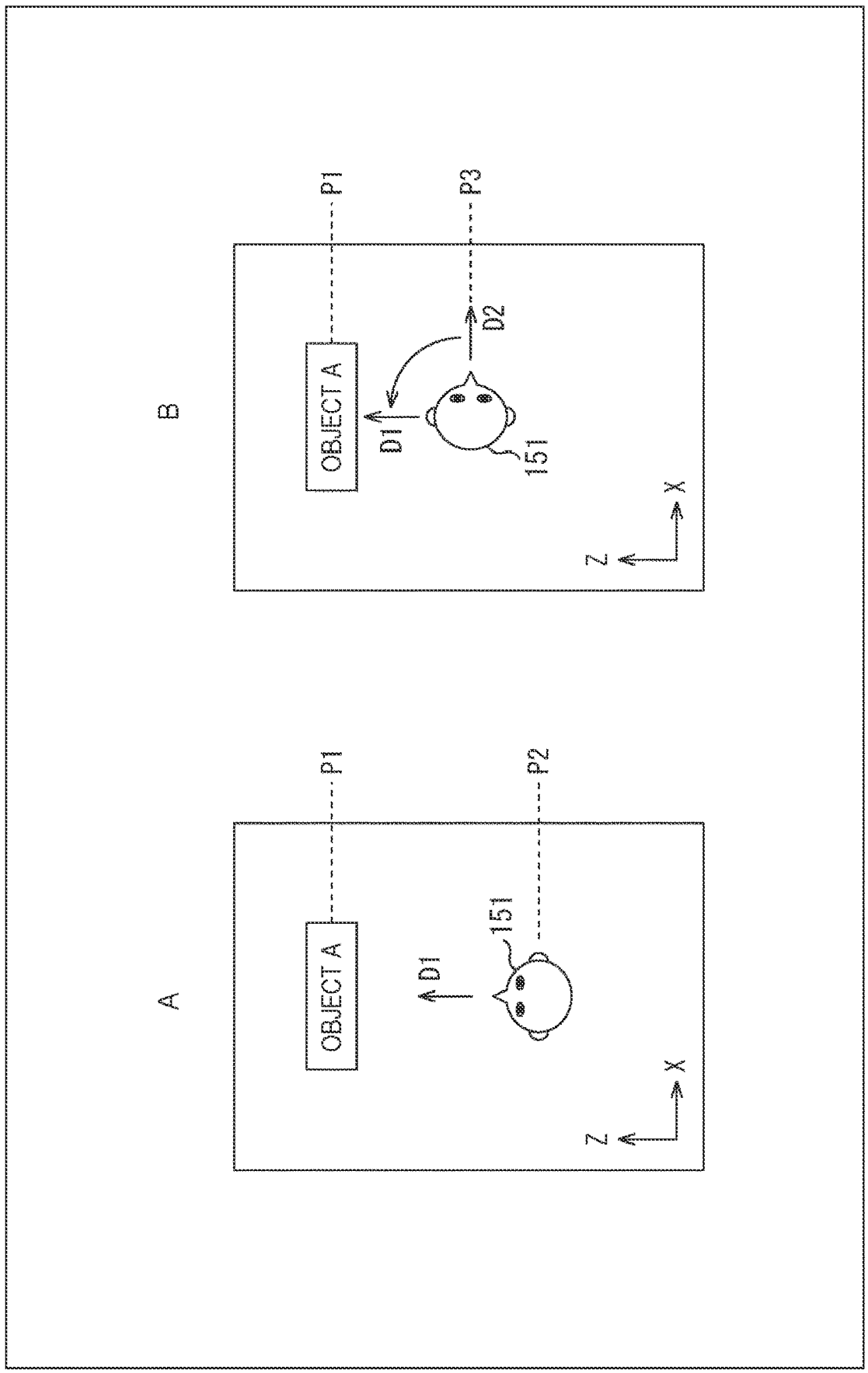
FIG. 7 is a diagram illustrating an example of an action of a user.

For example, as illustrated in A of FIG. 7, an object A is set as an object displayed at a position P1 defined in the world coordinate system. In a case where a user 151 looks at the object A when located at a position P2, the object A is displayed without causing the insufficient angle of view. For example, as illustrated in A of FIG. 8, the object A (an object having a shape like a ghost) is displayed on the display unit 53 without causing the insufficient angle of view.

As illustrated in B of FIG. 7, the user 151 is located at a position P3 near the position P1 where the object A is displayed, and faces a direction D2. The direction D2 is the X-axis direction in the world coordinate system, and is a direction different from the Z-axis direction in which the object A is displayed. Thus, when the user 151 faces the direction D2, even if the object A is displayed at the position P1, the user 151 is not in a state of being able to see the object A.

In a case where the user 151 changes the direction from a state of facing the direction D2 to a direction D1, the object A is displayed in front of the eyes. For example, as illustrated in B of FIG. 8, the object A is displayed large on the display unit 53, and the insufficient angle of view occurs. As described above, if a part of the object A is suddenly displayed on the screen when the user 151 looks back, for example, the user does not know what has happened and panics or stops moving.

The object A may be an immovable object as illustrated in FIG. 9. As the immovable object, for example, a signboard will be described as an example. A of FIG. 9 is a screen displayed on the display unit 53 when the object A and the user 151 are in an appropriate positional relationship as in A of FIG. 7, and the entire signboard as the object is displayed.

B of FIG. 9 is a screen displayed on the display unit 53 when the object A and the user 151 are in an inappropriate positional relationship as in B of FIG. 7, and a part of the signboard as the object is displayed. Since only a part of the signboard is displayed, it is difficult for the user to recognize what is displayed.

The object A may be an object that notifies the user of some information by text. For example, as illustrated in A of FIG. 10, a message "target store" may be displayed on the display unit 53 as the object A. A of FIG. 10 is a screen displayed on the display unit 53 when the object A and the user 151 are in an appropriate positional relationship as in A of FIG. 7, and the entire message of which notification is performed as the object is displayed, so that the user can read the message.

Figure 10:
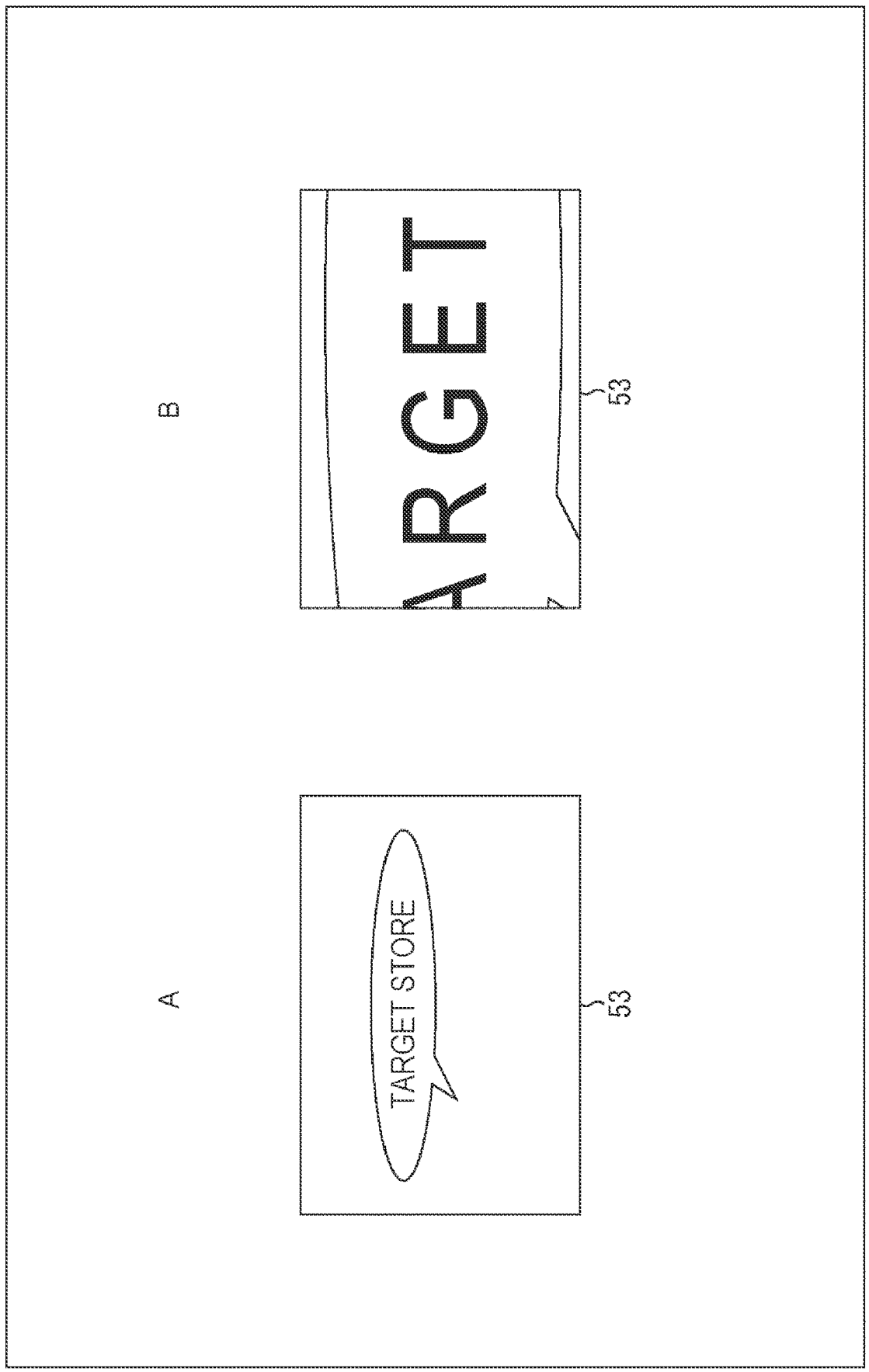
FIG. 10 is a diagram illustrating an example of the screen to be displayed.

B of FIG. 10 is a screen displayed on the display unit 53 when the object A and the user 151 are in an inappropriate positional relationship as in B of FIG. 7, and a part of the notification (message) as the object is displayed. Since only a part of the message is displayed, the user cannot read the displayed message.

As described above, in a case where the positional relationship between the object and the user is inappropriate, there is a possibility that inconvenience occurs such as the user being unable to recognize the object. Furthermore, the object is suddenly displayed or is displayed in a state in which the user cannot recognize the object, depending on the action of the user. Thus, as described below, the display of the object is controlled by an attribute of the object.

<Setting of Display Position and Size of Object>
<First Display Setting>

Figure 8:
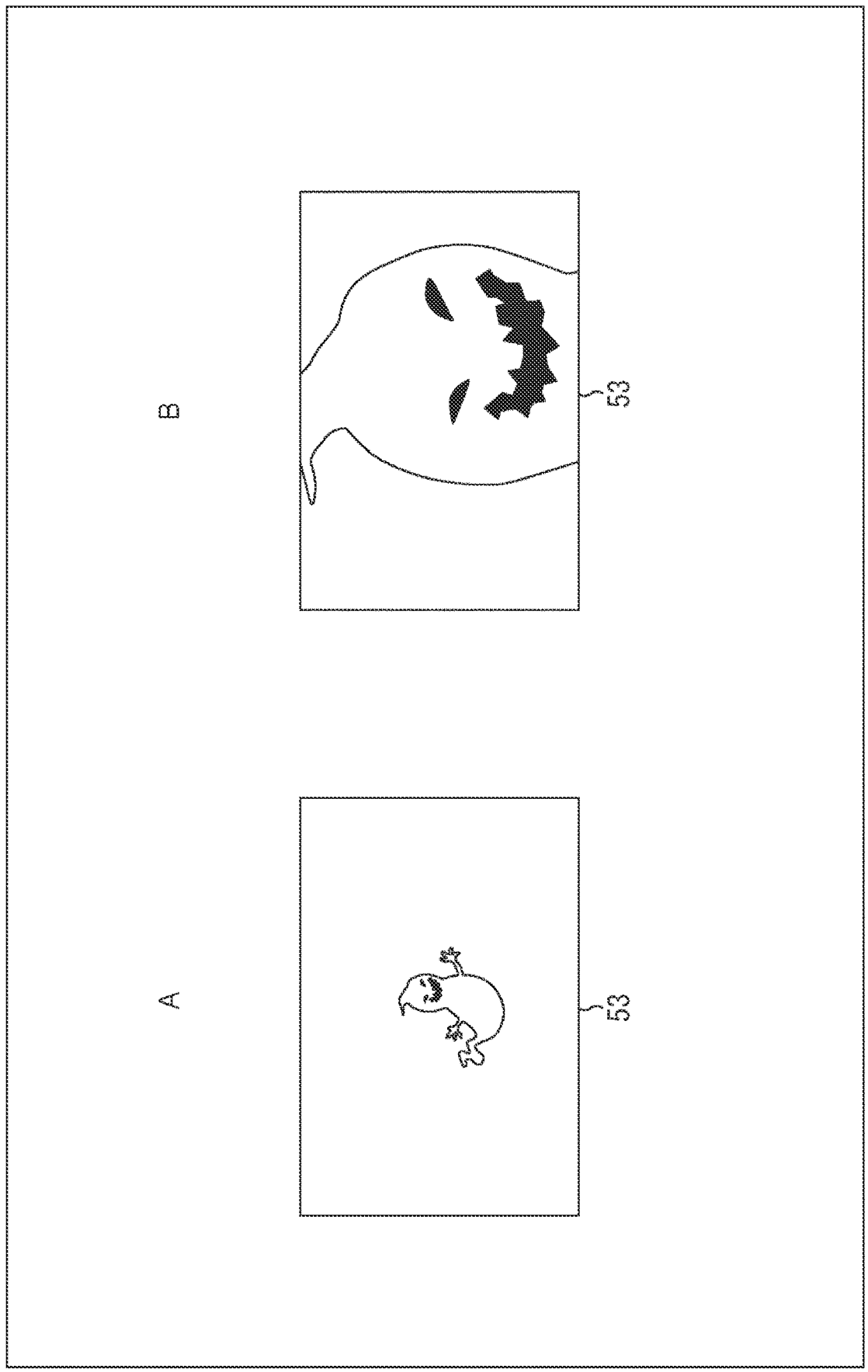
FIG. 8 is a diagram illustrating an example of a screen to be displayed.

A case will be described where the object A is a movable object such as a ghost as illustrated in FIG. 8. In a case where the object A is a movable object and is an object that does not give the user an uncomfortable feeling even in a case where display accompanied by some action is performed, a display as illustrated in FIG. 11 is performed.

Figure 11:
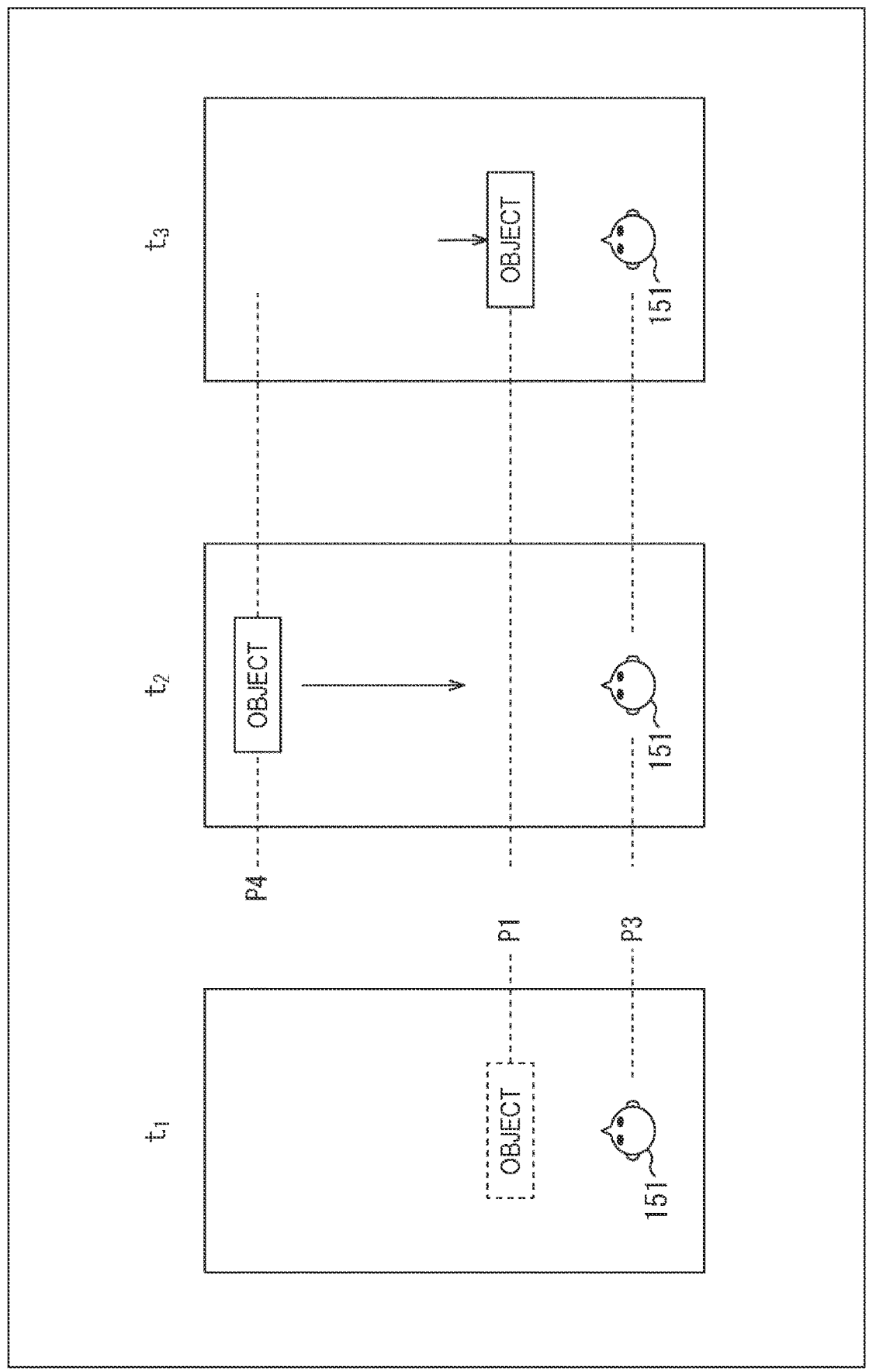
FIG. 11 is a diagram for explaining a display setting.

Referring to FIG. 11, the user 151 is located at the position P3 at a time t1. Furthermore, the position P3 is near the position P1 where the object A is displayed. In this state, as in the case described with reference to B of FIG. 7, when the object A is displayed at the position P1, a screen presented to the user 151 is as illustrated in B of FIG. 8, and is a screen in which the insufficient angle of view occurs.

Although there is the object A desired to be presented to the user 151 at the time t1, in a case where it is determined that an inconvenient display such as the insufficient angle of view is performed in a case where the object A is displayed at the position P1 set as a position to display the object A, the object A is displayed at a position P4 at a time t2. The position P4 is a position farther from the user 151 than the position P1. The object A is displayed at such position P4 away from the user 151.

For example, as illustrated in A of FIG. 8, the position P4 is a position at which the object A is displayed without causing the insufficient angle of view. In other words, the position is a position at which the object A is displayed to fall within death or an area of the user. The object is temporarily moved backward to the position P4 where the entire object A is displayed. At a time t3 after that, the object A is displayed at the position P1. Animation display is performed in which the object A gradually approaches user 151 from the position P4 to the position P1.

Figure 12:
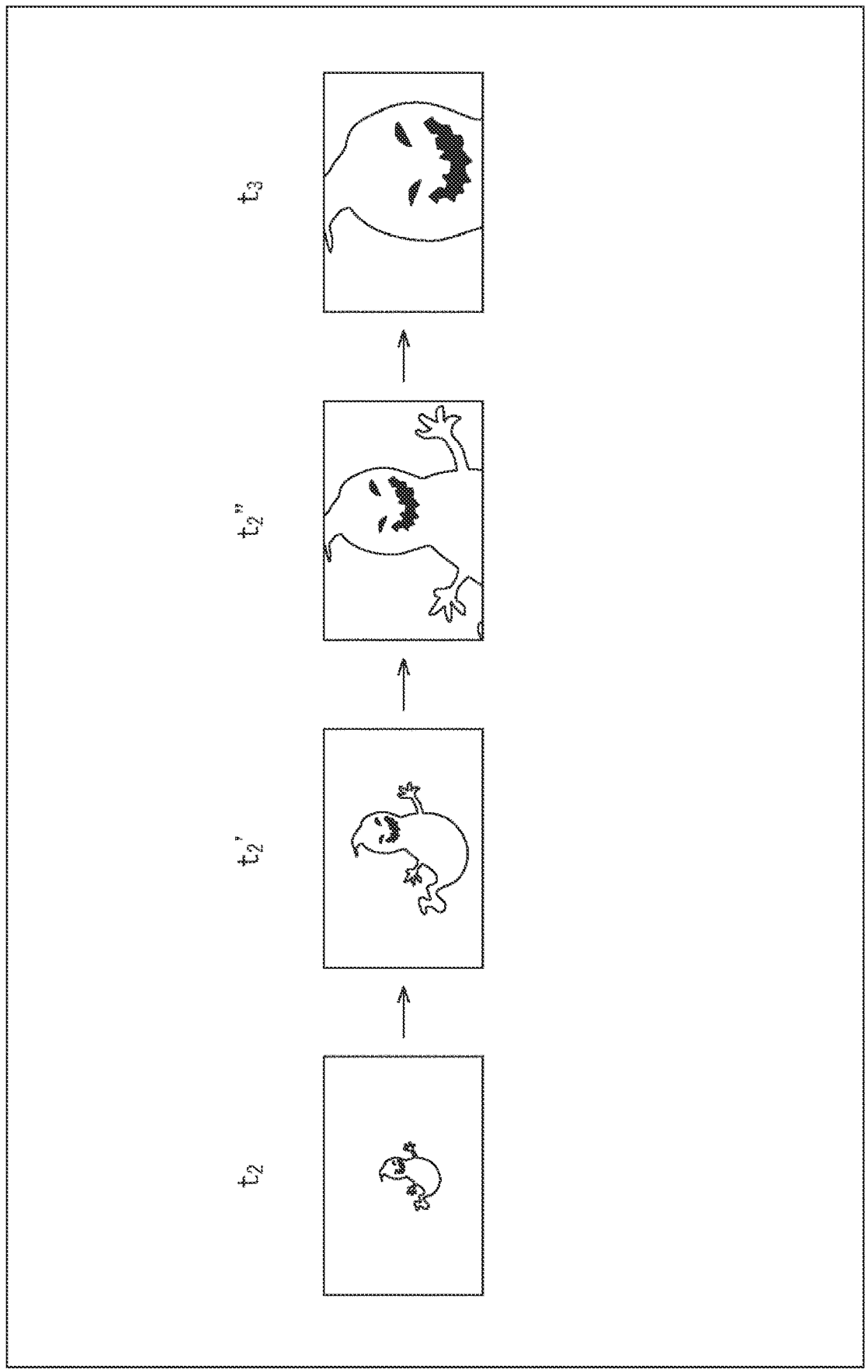
FIG. 12 is a diagram illustrating an example of the screen to be displayed.

With such display, for example, a screen as illustrated in FIG. 12 is presented to the user 151. At the time t2, since the object A is displayed at a distant position, the entire object A is displayed. The display of the object A gradually increases from the time t2 to the time t3.

The object A at a time t2' next to the time t2 is displayed larger than the object A at the time t2. Moreover, the object A at a time t2" next to the time t2' is displayed larger than the object A at the time t2'. Then, the object A at the time t3 next to the time t2" is displayed larger than the object A at the time t2".

When viewed from the user 151, the display is such that the object A gradually approaches the user oneself.

The position P1 set as the position where the object is displayed is described as a scheduled presentation position as appropriate. Furthermore, as a position at which the insufficient angle of view does not occur, a position at which the object is displayed first is described as an initial position as appropriate.

The position such as the scheduled presentation position or the initial position is a position at which the virtual object is displayed in a three-dimensional space, and represents a three-dimensional position at which the user wearing the AR-HMD 1 perceives that the virtual object exists in the superimposed and displayed real space when viewing the screen displayed on the display unit 53 (FIG. 5).

In a case where the present technology is applied to the AR-HMD 1 illustrated in FIGS. 1 to 3, a screen on which a real object or a virtual object arranged in the three-dimensional space is displayed is presented to the user by the AR-HDM1. The position is a position in the three-dimensional space where the user perceives (visually recognizes) the real object or the virtual object on the screen presented to the user.

In a case where the object has an attribute of a movable object, the AR-HMD 1 sets an initial position, temporarily displays the object at the initial position, and then displays an animation up to a preset scheduled presentation position.

The initial position can be set by, for example, an expression (2) below.

[Expression 2]

$$\begin{pmatrix} X \\ Y \\ Z \\ 1 \end{pmatrix} = \begin{pmatrix} 1 & 0 & 0 & 1 \\ 0 & 1 & 0 & 1 \\ 0 & 0 & 1 & d \\ 0 & 0 & 0 & 1 \end{pmatrix} \begin{pmatrix} x \\ y \\ z \\ 1 \end{pmatrix} \quad (2)$$

The expression (2) is an expression for calculating an initial position when the position of the user is (0, 0, 0). In the expression (2), (x, y, z) represents coordinates of the scheduled presentation position, and (X, Y, Z) represents the initial position. In the expression (2), d is depth information (Z coordinate) and is obtained by an expression (3).

[Expression 3]

$$d = W_{Disp} \times \cot\left(\frac{Fov(h)}{2}\right) \times \frac{1}{2} \quad (3)$$

The expression (3) is a modification of the expression (1). That is, d is a distance between the user and the virtual screen. The initial position is set from the expressions (2) and (3). Also in the following description, the description will be continued on the assumption that the initial position is calculated from the expressions (2) and (3).

Note that, here, the description has been given assuming that the entire object A is displayed in a case where the object A is displayed at the position P4 (initial position), but it is sufficient that the insufficient angle of view does not occur in at least one of the horizontal direction or the vertical direction of the object A. In other words, a position where the insufficient angle of view does not occur in at least one of the horizontal direction or the vertical direction of the object A is set as the initial position.

In other words, adjustment is performed so that the object A falls within the field of view area by adjusting the size of the display unit 53 in the horizontal direction and the size of the object A in the horizontal direction, or adjustment is performed so that the object A falls within the field of view area by adjusting the size of the display unit 53 in the vertical direction and the size of the object A in the vertical direction.

The initial position of the object A is set to fall within the field of view area, but its depth may be limited. For example, in a case where a movable range of the object A is set, the initial position may be set to fall within the movable range.

Furthermore, the description will be continued on the assumption that the coordinates in the Z-axis direction (depth direction) of the scheduled presentation position are changed for the position P4; however, for example, to perform an animation in which the position P4 gradually approaches from the upward direction (or the downward direction), the coordinates of the scheduled presentation position in the Z-axis direction and the Y-axis direction may be changed.

Note that, the field of view area is set to have a field of view angle less than or equal to a human field of view angle (for example, 180 degrees), and field of view area information used when the processing described above is performed is information of the set field of view angle.

<Second Display Setting>

Figure 13:
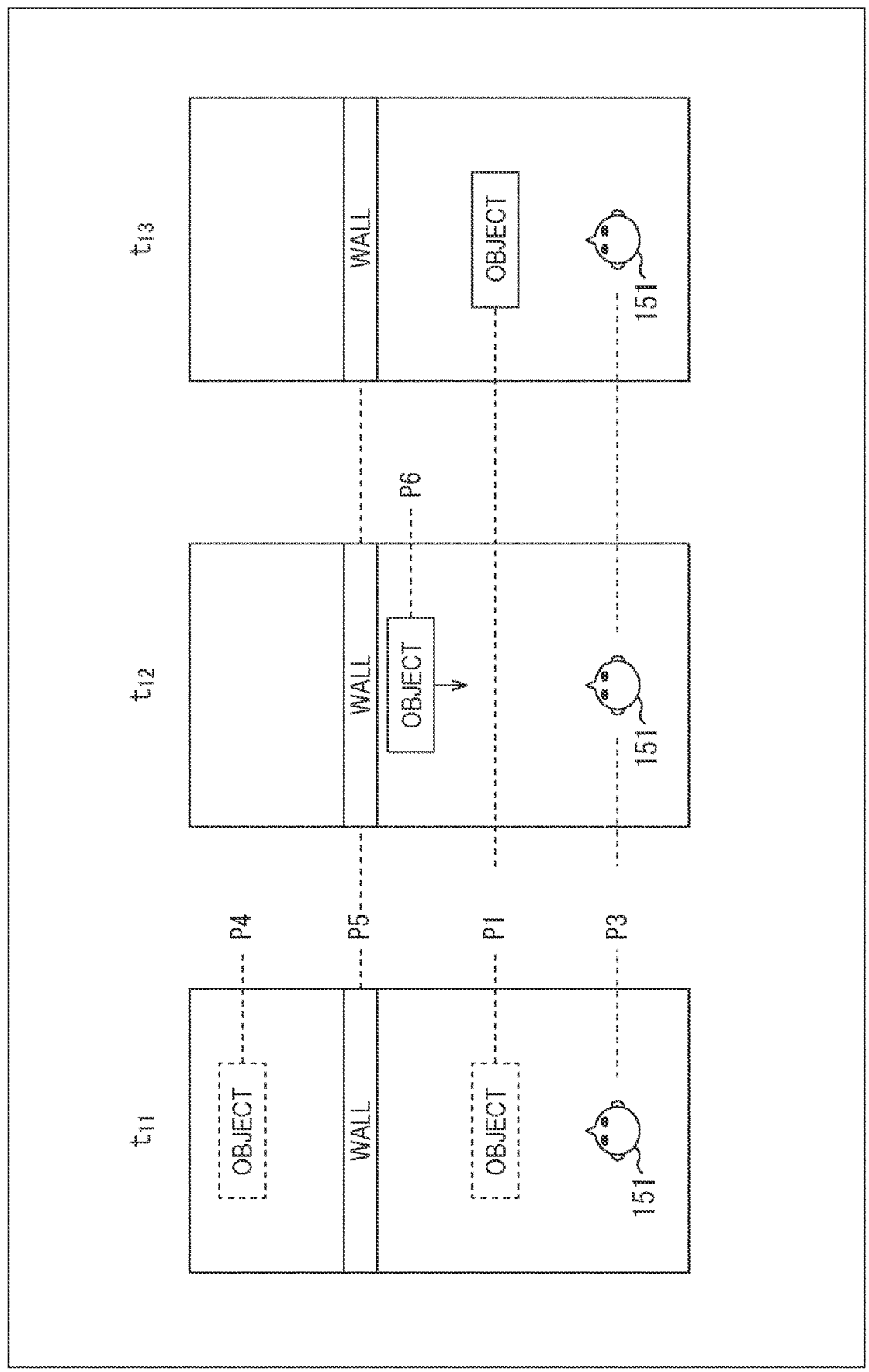
FIG. 13 is a diagram for explaining the display setting.

Another display method in a case where the object A is a movable object will be described with reference to FIG. 13. The state illustrated at a time t11 in FIG. 13 is a state similar to the state at the time t1 in FIG. 11, and when the object A is displayed at the position P1, the screen presented to the user 151 is a screen in which the insufficient angle of view occurs. Thus, in such a case, as described with reference to FIG. 11, the position of the position P4 where the insufficient angle of view does not occur is set as the initial position, and the object A is displayed.

However, the state illustrated at the time t11 in FIG. 13 is a state in which an obstacle such as a wall is present at a position P5 between the position P1 and the position P4. This obstacle may be an obstacle existing in the real world or may be an obstacle set in the virtual three-dimensional space.

As described above, in a case where there is an obstacle such as a wall between a position desired to be set as the initial position and the position P3 where the user is located, the object A cannot be displayed with the position P4 as the initial position.

In such a case, a position as far as possible from the user 151 is set as the initial position. In the situation as illustrated at the time t11 in FIG. 13, the position P5 where the wall is located is set as the initial position. As illustrated at a time t12 in FIG. 13, a position P6 is set as the initial position. To be precise, the position P6 is closer to the position P1 than the position P5. Furthermore, the position P6 is on the front side (user 151 side) from the position P5 in the depth direction, and is a position separated from the position P6 by a predetermined distance.

As described above, in a case where there is an area where an object cannot be displayed, such as an obstacle, in the depth direction, a distance (depth) to the obstacle is detected, and the initial position is set on the front side of the depth.

At the time t12, the object A is displayed at the position P6 (initial position). At a time t13, the object A is displayed at the position P1 (scheduled presentation position). From the position P6 to the position P1, animation display is performed in which the object A gradually approaches the user 151.

In a case where an object has an attribute of a movable object, an initial position is set, the object is temporarily displayed at the initial position, and then animation display is performed up to a preset scheduled presentation position. Furthermore, in a case where there is an obstacle such as a wall between a place desired to be set as the initial position and the scheduled presentation position, the position of the obstacle can be set as the initial position.

Figure 14:
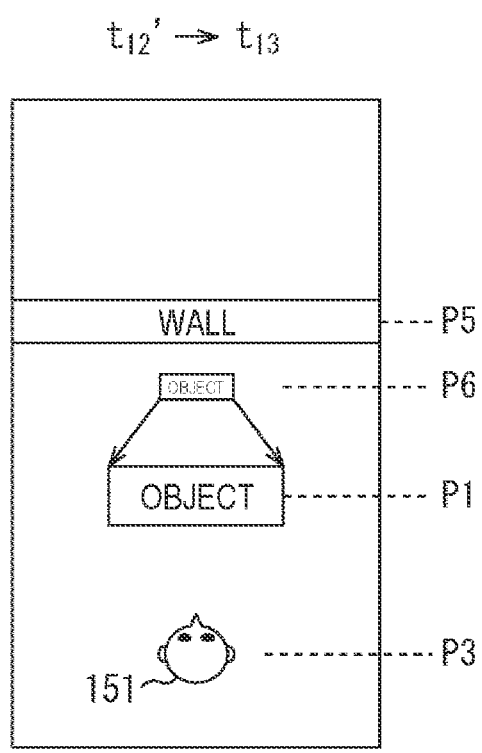
FIG. 14 is a diagram for explaining the display setting.

At the time t12 in FIG. 13, the object A is displayed at the position P6 set as the initial position, but the position P6 is a position where there is a possibility that the insufficient angle of view occurs. Thus, in a case where there is a possibility that the insufficient angle of view occurs even at the set initial position, the object A may be temporarily displayed small as illustrated at a time t12'→t13 in FIG. 14. "Displayed small" means that the object A is displayed smaller than the size indicated by the size information.

At the time t12', the object A is displayed at the position P6 with a size that does not cause the insufficient angle of view. In other words, the object A is displayed small at the position P6. Thereafter, until the time t13, the object A is displayed in an animation in which the object A is gradually enlarged, and gradually approaches the user.

Such a display can also be applied to a case where the object is an immovable object. A case will be described where the object is an immovable object as illustrated in FIG. 9. In a case where the object A is the immovable object, if a display is performed similar to that of the movable object described with reference to FIGS. 11 and 12, display is performed in which the immovable object moves, and an uncomfortable feeling is given to the user. Thus, in the case where the object is the immovable object, the object may be displayed in an original size (a size indicated by the size information) after being temporarily displayed small, as described with reference to FIG. 14.

However, in the case of the immovable object, an animation is not performed in which the object moves like the movable object, but the scheduled presentation position is set as the initial position, and the object is temporarily displayed small at the initial position. Such display will be described with reference to FIG. 15.

Figure 15:
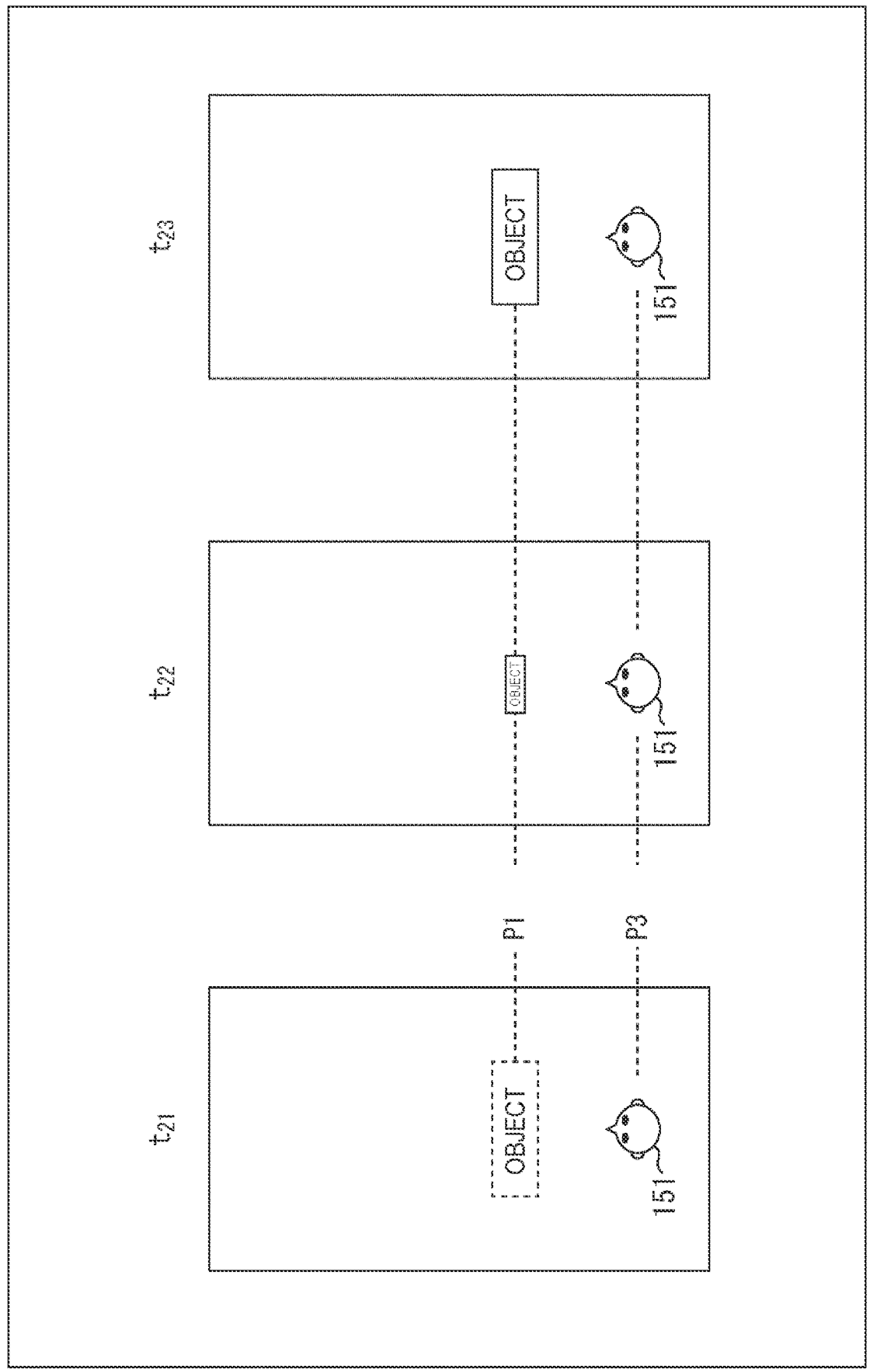
FIG. 15 is a diagram for explaining the display setting.

The state illustrated at a time t21 in FIG. 15 is a state similar to the state at the time t1 in FIG. 11, and when the object A is displayed at the position P1, the screen presented to the user 151 is a screen in which the insufficient angle of view occurs. In a case where an attribute of the immovable object is given to the object A, the scheduled presentation position is set as the initial position.

At a time t22, the object A is displayed small at the position P1. At a time t23, the object A is displayed at the position P1 with a size set as an originally displayed size.

An animation in which the object A gradually increases in size may be performed between the time t22 and the time t23. Alternatively, in the case where the object A is the immovable object, the display may be switched from a small display to a large display without performing the animation.

Alternatively, in the case of the small display, the object may be displayed light. Alternatively, instead of the small display, the object may be displayed light, and then displayed dark.

One object is to make the user recognize that the immovable object is at the position P1. When the user recognizes presence of the immovable object, if the user desires to see the entire immovable object according to the user's intention, the user performs an action such as stepping back. To cause a user to take such a voluntary action, the object is temporarily displayed small or displayed light.

Note that, in the case where the object A is the immovable object, it is also conceivable that uncomfortable feeling may be given to the user more when the display is performed as described above. In the case where the object A is the immovable object, even in a case where the insufficient angle of view occurs, it is also possible to perform setting such that the object A is displayed at the scheduled presentation position with the set size without changing the position or the size.

Furthermore, in the case of the immovable object, a sub attribute may be provided, an attribute for performing display with changed display as described above and an attribute for not performing display with changed display as described above may be provided, and the display may be controlled by the attribute.

<Third Display Setting>

Some of the objects of the immovable object are set to start an action, for example, speaking when the user sees the immovable object (when the immovable object enters a field of view angle of the user). In the case of such an object, for example, in a case where the object A utters in a state where the insufficient angle of view occurs, as illustrated in B of FIG. 9, there is a high possibility that the user is confused without knowing where the voice is being uttered.

Thus, as described above, the object A may be temporarily displayed small to cause the user to recognize presence of the object A, and then a sound may be output.

Alternatively, in the case of an object that is an immovable object and takes some action in a case where the object enters the field of view angle of the user, a setting may be made so that the action is not taken in a case where the object is displayed in a state where the insufficient angle of view occurs. As a condition under which the action occurs, it may be set as when a condition 1 and a condition 2 below are satisfied.

Condition 1

The object is within the field of view angle of the user (the entire object is displayed on the display unit 53)

Condition 2

The distance between the object and the user is within a certain range (less than or equal to a threshold value).

The condition 1 is a condition that the action is started when the object is visible to the user and when the insufficient angle of view does not occur. As described above, this is a condition for preventing an action from being started in a state where the insufficient angle of view occurs. The condition 1 can be determined by, for example, a determination expression (4) below.

[Expression 4]

$$\sqrt{\left(\frac{pt \cdot x}{pt \cdot w}\right)^2 + \left(\frac{pt \cdot y}{pt \cdot w}\right)^2} < 1 \qquad (4)$$

[Expression 5]

$$pt = M_{World} \times M_{Projection} \times M_{Objpos} \qquad (5)$$

In the expression (4), pt.w, pt.x, and pt.y represent a value representing a width calculated by the expression (5), a value in the x-axis direction, and a values in the y-axis direction, respectively. Furthermore, the expression (4) uses values obtained by dividing a length in the x-axis direction and a length in the y-axis direction by a width w to obtain a normalized calculation expression.

The expression (4) is an expression for determining whether or not a length of the oblique side of a right triangle having the length in the x-axis direction and the length in the y-axis direction of the object as the two sides falls within less than or equal to 1, in other words, an expression for determining whether or not the diagonal line of a quadrangle surrounding the object falls within less than or equal to 1, and when this determination expression is satisfied, the object is determined to be within the field of view angle.

In the expression (5), Mworld is a matrix in the world coordinates, Mprojection is a matrix related to projection, and Mobjpos is a matrix related to an object, and is an expression for projecting the coordinates of the object onto a visual cone.

The condition 1 may be determined by whether or not the expression described above is satisfied, or may be determined by another method.

With only the condition 1, there is a possibility that it is determined that all objects at positions distant from the user satisfy the condition 1. Thus, it is determined whether or not the user is present at a position close to the object according to the condition 2. In other words, it is determined, as the condition 2, whether or not the user is present within a range in which an action is set to be performed. With the condition 2, it is possible to prevent an object at a position distant from the user from causing an action.

The condition 2 can be determined by, for example, a determination expression (6) below.

[Expression 6]

$$d = |M_{Objpos} - M_{Camera}| < \text{Const.} \qquad (6)$$

In the expression (6), Mobjpos represents a position of the object, and Mcamera represents a position of the camera, that is, a position of the user. The expression (6) is an expression representing that a difference between the positions of the object and the user is a distance d and for determining whether or not the distance d is smaller than a preset threshold value Const.

When it is determined that the user enters the range set for the object to activate an action according to the condition 2, and it is determined that the object is displayed without causing the insufficient angle of view within the field of view angle according to the condition 1, the action associated with the object is activated.

<Fourth Display Setting>

The display method described with reference to FIG. 15 can also be applied to a case where the object A described with reference to FIG. 10 is a notification such as text. In the case of the text, as described with reference to B of FIG. 10, even if a part of the message is displayed, it is difficult to convey the message to the user, and as described with reference to A of FIG. 10, it is conceivable that the message can be conveyed by making the entire message visible.

Thus, as illustrated in B of FIG. 10, in a case where only a part of the message is displayed, the message (object A) is temporarily displayed small, and the user is caused to recognize presence of the object A. At this time, whether or not the user can read a message displayed small is not a problem, and it is sufficient that the user can recognize the presence of the message.

The state illustrated at the time t21 in FIG. 15 is the state similar to the state at the time t1 in FIG. 11, and when the object A is displayed at the position P1, the screen presented to the user 151 is the screen in which the insufficient angle of view occurs. In a case where an attribute of the text (message) is given to the object A, the scheduled presentation position is set as the initial position. That is, in this case, the position P1 set as the scheduled presentation position is set as the initial position.

At the time t22, the object A is displayed small at the position P1. At the time t23, the object A is displayed at the position P1 with the size set as the originally displayed size.

An animation in which the object A (message) gradually increases in size may be performed between the time t22 and the time t23. Alternatively, the display may be switched from a small display to a large display without performing the animation.

By causing the user to recognize that the message is at the position P1, if the user desires to see the entire message according to the user's intention, the user performs an action such as stepping back. For example, at the time t23, even in a state in which a part of the message is displayed as illustrated in B of FIG. 10, if the user recognizes that there is the message, the user can step back, to make a state in which the entire message is displayed as illustrated in A of FIG. 10, and can read the message.

As described above, the display method is set by the attribute of the object. Operation will be described of the AR-HMD 1 in which the display method is set as described above.

<Operation of AR-HMD 1>

The operation of the AR-HMD 1 that performs such display will be described with reference to a flowchart of FIG. 16.

In step S11, environment information is acquired. The environment information is environment information around the user, and is information regarding a real scenery viewed by the user via the AR-HMD 1. For example, information such as surrounding depth information, object recognition, a shape of a recognized object, and presence or absence of a moving object is acquired as the environment information.

In step S12, position information of the user is acquired. Here, physical information of the user, for example, a position of the head and a line of sight direction are acquired. The processing in steps S11 and S12 is performed by the sensor information acquisition unit 71 acquiring and processing sensor information from the sensor unit 52.

In step S13, it is determined whether or not there is an object to be displayed. It is determined whether or not there is a predetermined object to be displayed within the field of view of the user. In a case where it is determined in step S13 that there is no object to be displayed, the processing returns to step S11, and the subsequent processing is repeated.

On the other hand, in a case where it is determined in step S13 that there is an object to be displayed, the processing proceeds to step S14. In step S14, object size information is acquired. As the object size information, presentation position information (information of a scheduled presentation position) of the object to be displayed and information (size information) regarding a size of the object are acquired. As the size information, 3D model data can be used.

In step S15, it is determined whether or not the insufficient angle of view occurs (whether or not the object falls within the field of view area) using the object size information acquired in step S14. In a case where it is determined in step S15 that the insufficient angle of view does not occur, the processing proceeds to step S20. In step S20, output processing, in this case, object display is performed.

On the other hand, in a case where it is determined in step S15 that the insufficient angle of view occurs, the processing proceeds to step S16. In step S16, the attribute of the object to be displayed is referred to. The attribute is information used to determine which one of the first to fourth display settings described above is used for display when the insufficient angle of view occurs.

As described above, the attribute information may be information representing a feature of an object to be displayed, such as a movable object, an immovable object, or text. Furthermore, the attribute information may be information that directly represents one of the first to fourth display settings, for example, information such as "1" in a case where the first display setting is displayed, and "2" in a case where the second display setting is displayed.

Furthermore, as in the first and second display settings, display for setting the initial position may be set as a position change attribute, and as in the fourth display setting, display may be set as a size change attribute for changing the size at the scheduled presentation position and displaying, and such information may be used as the attribute information. In the following description, the description will be continued by exemplifying a case where the position change attribute and the size change attribute are used as the attribute information.

Such attribute information may be acquired together with the object size information as information accompanying the object size information.

In a case where it is determined in step S16 that the attribute of the object to be displayed is the position change attribute, the processing proceeds to step S17. In step S17, it is determined whether or not there is a display restriction in the depth direction. The depth direction is the Z-axis direction in the world coordinate system, and it is determined whether or not there is a display restriction in the Z-axis direction.

For example, as described with reference to FIG. 13, in a case where there is an obstacle such as a wall in the depth direction and an object cannot be displayed at a position ahead of such an obstacle, it is determined in step S17 that there is a display restriction in the depth direction.

In a case where it is determined in step S17 that there is no display restriction in the depth direction, the processing proceeds to step S18. In step S18, an initial position is set in which the position of the object in the Z direction is shifted. The processing of step S18 is executed when the first display setting is executed and in a case where the display is performed as described with reference to FIG. 11.

Step S18 is processing of setting an initial position referred to as the position P4 in the description with reference to FIG. 11. When the initial position is set, the processing proceeds to step S19. In step S19, display data is generated for displaying the object at the initial position and performing animation display up to the scheduled presentation position (the position referred to as the position P1 in FIG. 11 and the like), and display based on the generated display data is performed in step S20.

On the other hand, in a case where it is determined in step S17 that there is a display restriction in the depth direction, the processing proceeds to step S21. In step S21, it is determined whether or not the object has an action. In a case where it is determined in step S21 that the object has no action, the processing proceeds to step S22.

The processing of step S22 is executed when the second display setting is executed. The second display setting has been described with reference to FIGS. 13, 14, and 15. As described with reference to FIGS. 13 and 14, the position on the front side (the side facing the user) from the obstacle in the depth direction, preferably the position on the front side separated by a predetermined distance from the position of the obstacle in the depth direction may be set as the initial position, and display may be performed from the initial position to the scheduled presentation position by animation (referred to as a 2-1st display setting). Alternatively, as described with reference to FIG. 15, the scheduled presentation position may be set as the initial position, and the object may be displayed small at the initial position and then displayed large (a 2-2nd display setting).

In the case of an object that has a display restriction in the depth direction and does not cause an action, whether the display is performed according to the 2-1st display setting or the display is performed according to the 2-2nd display setting may also be given in association with the object as the attribute information. Furthermore, in the case of the movable object, the display may be performed according to the 2-1st display setting, and in the case of the immovable object, the display may be performed according to the 2-2nd display setting.

Furthermore, in a case where there is a display restriction in the depth direction, the scheduled presentation position can be set as the initial position. In such a configuration, the object is displayed at the scheduled presentation position.

In step S22, a position on the front side from the obstacle in the depth direction or the scheduled presentation position is set as the initial position. In step S23, display data is generated for displaying the object at the initial position and performing animation display up to the scheduled presentation position, and display based on the generated display data is performed in step S20.

Note that, in step 23, whether or not to perform animation display can be set depending on the object. In step S23, a setting may be made in which the animation display is not performed, and data may be generated such that the object is displayed at the initial position and then switched to the display at the scheduled presentation position.

On the other hand, in a case where it is determined in step S21 that the object has an action, the processing proceeds to step S24. The processing of step S24 is executed when the third display setting is executed.

The third display setting is a display that an associated action (for example, an action of uttering) is activated when the user is located near the object and the entire object (a state in which the insufficient angle of view does not occur in at least one of the horizontal direction or the vertical direction) is displayed within the field of view angle of the user.

Thus, since the initial position is the scheduled presentation position, the setting of the initial position is omitted (processing may be executed of setting the scheduled presentation position as the initial position). In step S24, a trigger is set. This trigger is a trigger set in advance as a condition for activating the action, and as described above, in this case, is a condition that the object is displayed within the field of view angle of the user. In other words, a trigger for activating the action is set when the condition 1 and condition 2 described above are satisfied.

Note that, the condition 2 is satisfied when it is determined in step S13 that there is an object to be displayed. That is, when the user enters the set range, it is determined in step S13 that there is an object to be displayed. Thus, it is sufficient that the trigger set in step S24 is a trigger related to the condition 1.

Note that, as described above, the third display setting may be combined with the second display setting. That is, it is also possible to set a standby state until the trigger is generated after the object is temporarily displayed small or the display position is changed.

Figure 16:
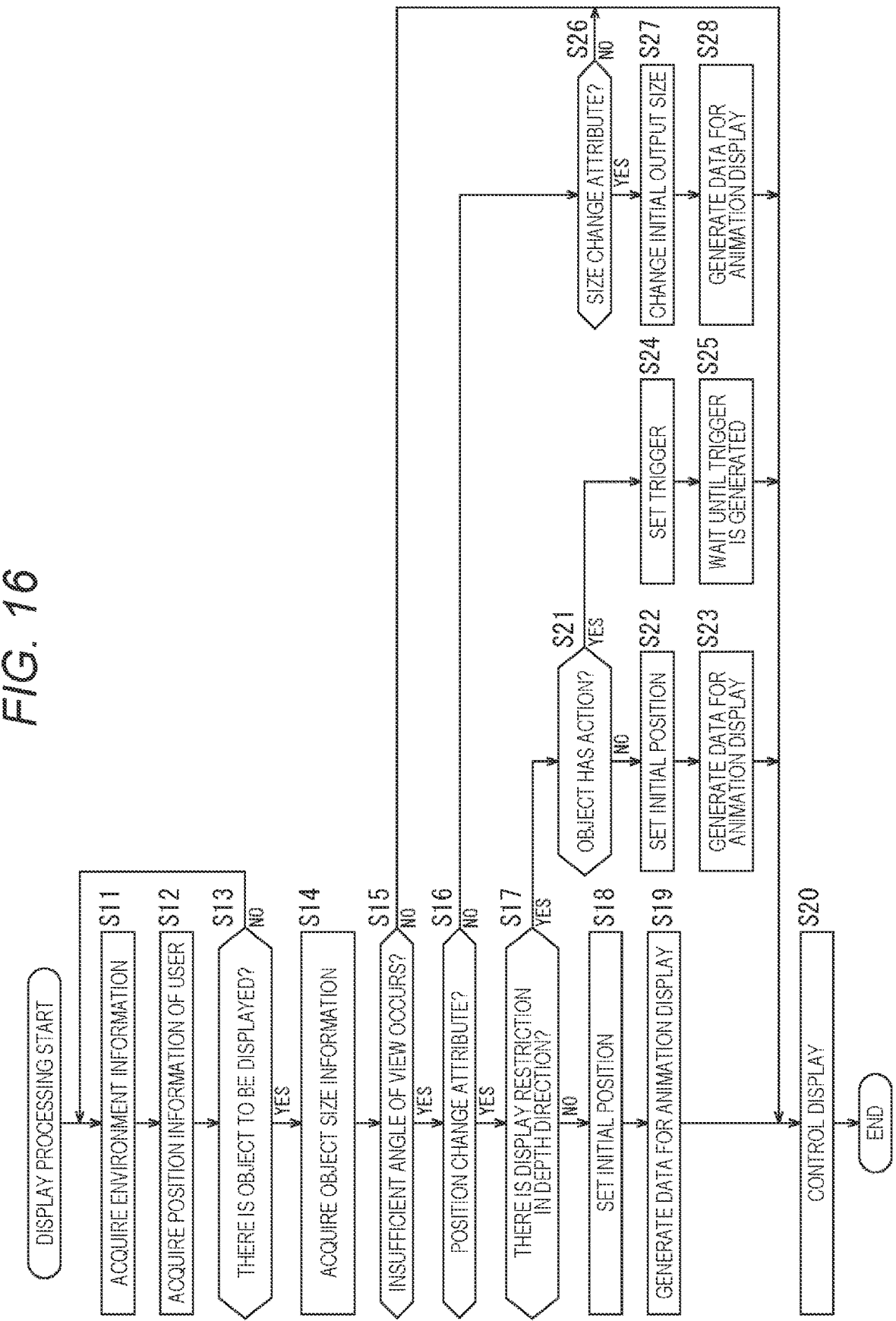
FIG. 16 is a flowchart for explaining operation of the information processing device.

Furthermore, here, a case has been described where the attribute information of the object with which the action is associated is the position change attribute, as an example; however, the attribute information may be the size change attribute, and in the case of the size change attribute, it can be dealt with by interchanging the flow of the processing illustrated in FIG. 16.

In step S25, a standby state is set until the trigger is generated, and when the trigger is generated, the processing proceeds to step S20, and the action associated with the object is activated. That is, a plurality of conditions for activating the action is set in advance, and the action is activated in a case where it is determined that at least some of the conditions, in this case, a condition is satisfied that the object is displayed in the field of view of the user set as the trigger.

On the other hand, in a case where it is determined in step S16 that the object to be displayed does not have the position change attribute, the processing proceeds to step S26. In step S26, it is determined whether or not the attribute is the size change attribute. In a case where it is determined in step S26 that the attribute is the size change attribute, the processing proceeds to step S27.

The processing of step S27 is executed when the fourth display setting is executed and when the display is performed as described with reference to FIG. 15. That is, the object such as the text is temporarily displayed at the scheduled presentation position with a size smaller than the size to be displayed at the scheduled presentation position, and then is displayed to be enlarged to the scheduled presentation size.

In step S27, an initial output size is changed. In step S28, the object is displayed with the initial output size, display data is generated for performing animation display until a scheduled presentation size is reached, and display based on the generated display data is performed in step S20.

On the other hand, in a case where it is determined in step S26 that the attribute is not the size change attribute, the processing proceeds to step S20. In this case, there is a possibility that the object is displayed in a state in which the insufficient angle of view occurs, but for the object, a setting is made such that, even in such a state, display is not performed in which the initial position is changed or the size is changed. Thus, in step S20, the object is displayed in the scheduled presentation size at the scheduled presentation position.

As described above, in a case where there is a possibility that the insufficient angle of view occurs, the display is controlled by changing the initial position or changing the size. Such display is performed before the insufficient angle of view occurs, so that the user can confirm the entire object temporarily, and even if the insufficient angle of view occurs thereafter, it is possible to prevent the user from being conscious of the insufficient angle of view.

When the insufficient angle of view occurs, and the user is conscious of the insufficient angle of view, there is a possibility that a sense of immersion in AR experience is weakened; however, according to the present technology, it is possible to prevent the sense of immersion from being weakened, and to cause the user to enjoy the AR experience more.

Note that, in the embodiment described above, more detailed display setting can be performed by setting the attribute information. A designer can set the attribute information and the display setting.

In the embodiment described above, in a case where a situation occurs in which the initial position is set, and display is performed at the initial position, and then display is performed at the scheduled presentation position, and thereafter display is performed at the initial position again, the initial position may be set again and similar display may be repeated, or in the second and subsequent times, display may be performed at the scheduled presentation position without setting the initial position.

Note that, in a case where the display position is changed as in, for example, the first display setting described above, in the case of an object associated with a position or object in the real world, there is a possibility that the association does not make sense. Thus, an attribute of prohibiting the change (adjustment) of the display position may be given to the object associated with the position or object in the real world, and the display position may be prevented from being changed.

Furthermore, in the case of such an object, a change of the display size may be allowed within a range in which the association is not broken, and such an attribute may be given.

<Recording Medium>

A series of processing steps described above can be executed by hardware, or can be executed by software. In a case where the series of processing steps is executed by software, a program constituting the software is installed in a computer. Here, the computer includes a computer incorporated in dedicated hardware, and a computer capable of executing various functions by installation of various programs, for example, a general purpose personal computer, and the like.

Figure 17:
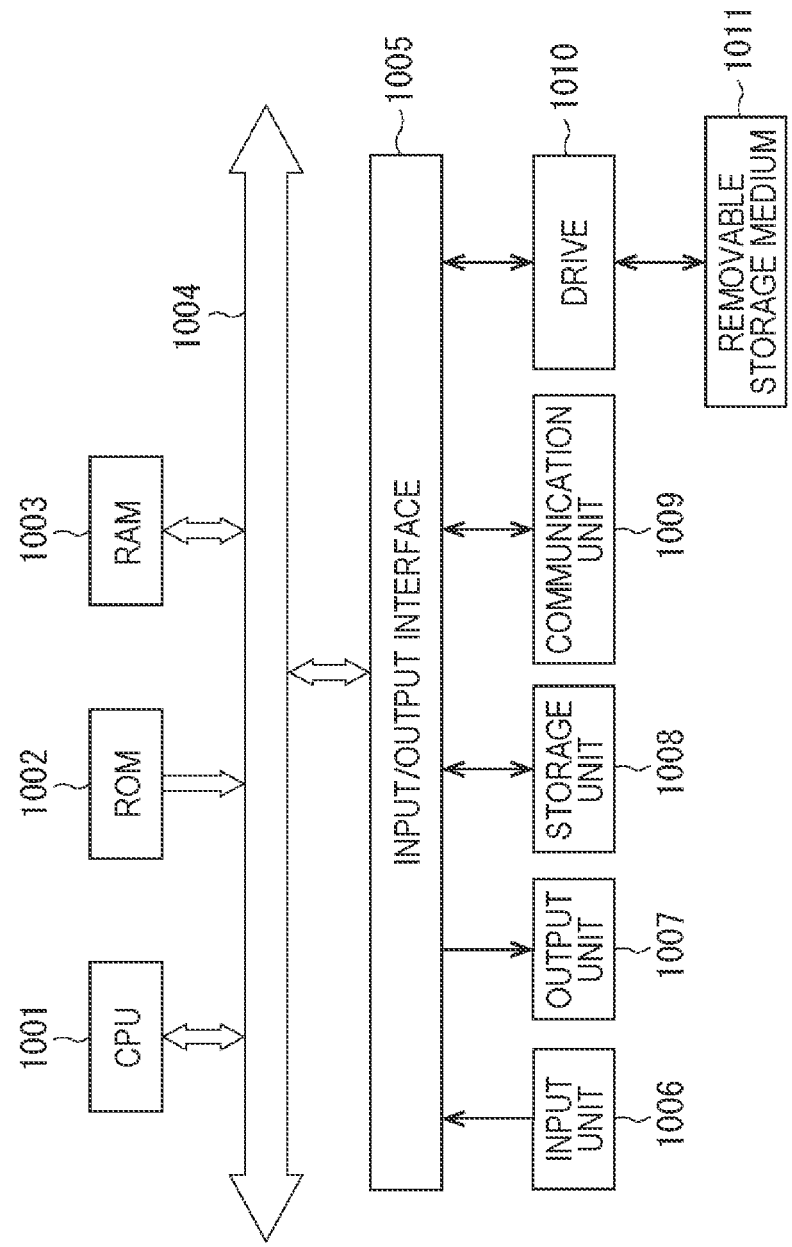
FIG. 17 is a diagram for explaining a recording medium.

FIG. 17 is a block diagram illustrating a configuration example of hardware of the computer that executes the above-described series of processing steps by the program. In the computer, a central processing unit (CPU) 1001, a read only memory (ROM) 1002, and a random access memory (RAM) 1003 are connected to each other by a bus 1004. Moreover, an input/output interface 1005 is connected to the bus 1004. The input/output interface 1005 is connected to an input unit 1006, an output unit 1007, a storage unit 1008, a communication unit 1009, and a drive 1010.

The input unit 1006 includes a keyboard, a mouse, a microphone, and the like. The output unit 1007 includes a display, a speaker, and the like. The storage unit 1008 includes a hard disk, a nonvolatile memory, or the like. The communication unit 1009 includes a network interface and the like. The drive 1010 drives a removable recording medium 1011 such as a magnetic disk, an optical disk, a magneto-optical disk, or a semiconductor memory.

In the computer configured as described above, for example, the CPU 1001 loads the program stored in the storage unit 1008 to the RAM 1003 via the input/output interface 1005 and the bus 1004 to execute the series of the processing steps described above.

The program executed by the computer (CPU 1001) can be provided, for example, by being recorded in the removable recording medium 1011 as a package medium or the like. Furthermore, the program can be provided via a wired or wireless transmission medium such as a local area network, the Internet, or digital satellite broadcasting.

In the computer, the program can be installed to the storage unit 1008 via the input/output interface 1005 by mounting the removable recording medium 1011 to the drive 1010. Furthermore, the program can be received by the communication unit 1009 via the wired or wireless transmission medium, and installed to the storage unit 1008. Besides, the program can be installed in advance to the ROM 1002 and the storage unit 1008.

Note that, the program executed by the computer can be a program by which the processing is performed in time series along the order described herein, and can be a program by which the processing is performed in parallel or at necessary timing such as when a call is performed.

Furthermore, in the present specification, the system represents an entire device including a plurality of devices.

Note that, the advantageous effects described in the specification are merely examples, and the advantageous effects of the present technology are not limited to them and may include other effects.

Note that, the embodiment of the present technology is not limited to the embodiment described above, and various modifications are possible without departing from the scope of the present technology.

Note that, the present technology can also be configured as described below.

(1)
An information processing device including
a setting unit that sets an initial position at which an object is initially displayed on a display unit on the basis of presentation position information regarding a presentation position to be presented in a virtual three-dimensional space of the object superimposed and displayed on a real world, size information regarding a size of the object, and field of view area information regarding a field of view area of the display unit that displays the object, in which
the setting unit sets the initial position on a deeper side in a depth direction than a position represented by the presentation position information in a coordinate system based on the real world.

(2)
The information processing device according to (1), in which
the setting unit sets the initial position when determining that at least a part of the object does not fall within the field of view area in a case where the object is displayed at the presentation position in the size represented by the size information.

(3)
The information processing device according to (1) or (2), in which the setting unit sets, as the initial position, a position at which the object falls within the field of view area.

(4)
The information processing device according to any of (1) to (3), in which
the setting unit sets, as the initial position, a position at which at least one of a horizontal direction or a vertical direction of the object falls within the field of view area.

(5)
The information processing device according to any of (1) to (4), in which
the information processing device displays an animation of moving the object from the initial position to the presentation position.

(6)
The information processing device according to any of (1) to (5), in which
in a case where there is an obstacle in the depth direction, the setting unit sets the initial position on the basis of a position of the obstacle.

(7)
The information processing device according to (6), in which
in the case where there is the obstacle in the depth direction, the setting unit sets, as the initial position, a position before a position of the obstacle in the depth direction.

(8)
The information processing device according to (6) or (7), in which
in the case where there is the obstacle in the depth direction, the setting unit sets the presentation position as the initial position.

(9)
The information processing device according to any of (6) to (8), in which
in the case where there is the obstacle in the depth direction, the setting unit displays the object at the initial position set, with a size smaller than a size indicated by the size information.

(10)
The information processing device according to any of (1) to (9), in which the setting unit sets the presentation position as the initial position, and sets the object with a size in which the object falls within the field of view area.

(11)

The information processing device according to any of (1) to (10), in which in a case where a predetermined action is associated with the object, when it is determined that the object falls within the field of view area, the setting unit determines that at least a part of a condition for activating the predetermined action is satisfied.

(12)

The information processing device according to any of (1) to (11), in which the information processing device sets the initial position on the basis of an attribute of the object.

(13)

The information processing device according to (12), in which in a case where the attribute of the object is an attribute of a movable object, the setting unit sets, as the initial position, a position at which the object falls within the field of view area.

(14)

The information processing device according to (12), in which in a case where the attribute of the object is an attribute of an immovable object, the setting unit sets the presentation position as the initial position.

(15)

The information processing device according to (12), in which in a case where the attribute of the object is a size change attribute, the setting unit changes a size in which the object is displayed.

(16)

The information processing device according to (14), in which the object is text.

(17)

An information processing method including:

setting an initial position at which an object is initially displayed on a display unit on the basis of presentation position information regarding a presentation position to be presented in a virtual three-dimensional space of the object superimposed and displayed on a real world, size information regarding a size of the object, and field of view area information regarding a field of view area of the display unit that displays the object; and setting the initial position on a deeper side in a depth direction than a position represented by the presentation position information in a coordinate system based on the real world, by an information processing device.

(18)

A program for causing a computer to execute processing including steps of:

setting an initial position at which an object is initially displayed on a display unit on the basis of presentation position information regarding a presentation position to be presented in a virtual three-dimensional space of the object superimposed and displayed on a real world, size information regarding a size of the object, and field of view area information regarding a field of view area of the display unit that displays the object; and setting the initial position on a deeper side in a depth direction than a position represented by the presentation position information in a coordinate system based on the real world.

REFERENCE SIGNS LIST

1 AR-HMD
2 Information processing device
3 Network
11 Display unit
12 Camera
31 CPU
32 Memory
33 Sensor unit
34 Input unit
35 Output unit
36 Communication unit
37 Bus
51 Control unit
52 Sensor unit
53 Display unit
54 Speaker
55 Communication unit
56 Operation input unit
57 Storage unit
71 Sensor information acquisition unit
72 Direction detection unit
73 Object size setting unit
74 Layout parameter calculation unit
75 Layout determination unit
76 Output control unit
101 User
121 Object
122, 123 Virtual screen

The invention claimed is:

1. An information processing device comprising
a setting unit that sets an initial position at which an object is initially displayed on a display unit on a basis of presentation position information regarding a presentation position to be presented in a virtual three-dimensional space of the object superimposed and displayed on a real world, size information regarding a size of the object, and field of view area information regarding a field of view area of the display unit that displays the object, wherein
the setting unit sets the initial position on a deeper side in a depth direction than a position represented by the presentation position information in a coordinate system based on the real world, and
the setting unit is implemented via at least one processor.

2. The information processing device according to claim 1, wherein
the setting unit sets the initial position when determining that at least a part of the object does not fall within the field of view area in a case where the object is displayed at the presentation position in the size represented by the size information.

3. The information processing device according to claim 1, wherein
the setting unit sets, as the initial position, a position at which the object falls within the field of view area.

4. The information processing device according to claim 1, wherein the setting unit sets, as the initial position, a position at which at least one of a horizontal direction or a vertical direction of the object falls within the field of view area.

5. The information processing device according to claim 1, wherein
the information processing device displays an animation of moving the object from the initial position to the presentation position.

6. The information processing device according to claim 1, wherein
in a case where there is an obstacle in the depth direction, the setting unit sets the initial position on a basis of a position of the obstacle.

7. The information processing device according to claim 6, wherein
in the case where there is the obstacle in the depth direction, the setting unit sets, as the initial position, a position before a position of the obstacle in the depth direction.

8. The information processing device according to claim 6, wherein
in the case where there is the obstacle in the depth direction, the setting unit sets the presentation position as the initial position.

9. The information processing device according to claim 6, wherein
in the case where there is the obstacle in the depth direction, the setting unit displays the object at the initial position set, with a size smaller than a size indicated by the size information.

10. The information processing device according to claim 1, wherein
the setting unit sets the presentation position as the initial position, and sets the object with a size in which the object falls within the field of view area.

11. The information processing device according to claim 1, wherein
in a case where a predetermined action is associated with the object, when it is determined that the object falls within the field of view area, the setting unit determines that at least a part of a condition for activating the predetermined action is satisfied.

12. The information processing device according to claim 1, wherein
the information processing device sets the initial position on a basis of an attribute of the object.

13. The information processing device according to claim 12, wherein
in a case where the attribute of the object is an attribute of a movable object, the setting unit sets, as the initial position, a position at which the object falls within the field of view area.

14. The information processing device according to claim 12, wherein
in a case where the attribute of the object is an attribute of an immovable object, the setting unit sets the presentation position as the initial position.

15. The information processing device according to claim 12, wherein
in a case where the attribute of the object is a size change attribute, the setting unit changes a size in which the object is displayed.

16. The information processing device according to claim 15, wherein
the object is text.

17. An information processing method comprising:
setting an initial position at which an object is initially displayed on a display unit on a basis of presentation position information regarding a presentation position to be presented in a virtual three-dimensional space of the object superimposed and displayed on a real world, size information regarding a size of the object, and field of view area information regarding a field of view area of the display unit that displays the object; and
setting the initial position on a deeper side in a depth direction than a position represented by the presentation position information in a coordinate system based on the real world,
by an information processing device.

18. A non-transitory computer-readable medium having embodied thereon a program, which when executed by a computer causes the computer to execute a method, the method comprising:
setting an initial position at which an object is initially displayed on a display unit on a basis of presentation position information regarding a presentation position to be presented in a virtual three-dimensional space of the object superimposed and displayed on a real world, size information regarding a size of the object, and field of view area information regarding a field of view area of the display unit that displays the object; and
setting the initial position on a deeper side in a depth direction than a position represented by the presentation position information in a coordinate system based on the real world.

* * * * *